United States Patent [19]

Lee

[11] Patent Number: 6,067,520

[45] Date of Patent: *May 23, 2000

[54] SYSTEM AND METHOD OF RECOGNIZING CONTINUOUS MANDARIN SPEECH UTILIZING CHINESE HIDDEN MARKOU MODELS

[75] Inventor: Lin-Shan Lee, Taipei, Taiwan

[73] Assignee: Lee and Li, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 08/580,594

[22] Filed: Dec. 29, 1995

[51] Int. Cl.[7] .................................................. G10L 5/06

[52] U.S. Cl. .................. 704/270; 704/256; 704/231; 704/233

[58] Field of Search .................... 395/2.65, 2.51, 395/2.52; 704/2, 9, 251, 253, 256, 231, 233, 255, 270, 275

[56] References Cited

U.S. PATENT DOCUMENTS

| | | | |
|---|---|---|---|
| 5,220,639 | 6/1993 | Lee | 395/2 |
| 5,602,960 | 2/1997 | Hon et al. | 395/2.16 |
| 5,680,510 | 10/1997 | Hon et al. | 395/2.64 |
| 5,717,828 | 2/1998 | Rothenburg | 395/2.79 |
| 5,751,905 | 5/1998 | Chen et al. | 395/2.63 |
| 5,752,227 | 5/1998 | Lyberg | 704/235 |

OTHER PUBLICATIONS

Hon et al. Towards Large Vocabulary Mandarin Chinese Speech Recognition. ICASSP '94: Acoustics, Speech and Signal Processing Conference, 1994.

Lee et al. Golden Mandarin (I) A real time Mandarin Speech dictation Machine for Chinese Languagte with Very Large Vocabulary. IEEE Transactions on Speech and Audio Processing. vol. 1 Issue 2, Apr. 1993.

Wang et al. Complete Recognition of Continuous Mandarin Speech for Chinese Language with Very Large Vocabulary but limited Training Data. ICASSP '95: Acoustics, Speech and Signal Processing Conference, May 1995.

Lyu et al. Golden Mandarin (III) A user adaptive prosodic segment based mandarin dictation machine for chinese lagnuage with very large vocabulary. ICASSP '95: Acoustics, Speech and Signal Processing Conference, May 1995.

Chen et al. Tone Recognition of Continuous Mandarin Speech Based on Neural Networks. IEEE Transactions on Speech and Audio Processing. vol. 3, Issue 2, Mar. 1995.

Lee et al. Golden Mandarin (II) An Intelligent Mandarin Dictation Machine for Chinese Character INput with Adaptation/Learning Functions Speech, Image Processing, and Neural Networks, 1994 Internation Symposium, 1994.

Lee et al. Goldent Mandarin (II) An Improved Signle Chip real time mandarin dictaion machine for chinese language with very large vocabulary. ICASSP '93: Acoustics speech and Signal Processing Conference, 1993.

Liu et al. A real time Mandarin dictation machine for Chinese language. ICASSP '90: Acoustics Speech and Signal Processing Conference, 1990.

(List continued on next page.)

*Primary Examiner*—Emanuel Todd Voeltz
*Assistant Examiner*—M. David Sofocleous
*Attorney, Agent, or Firm*—Pillsbury Madison & Sutro Intellectual Property

[57] ABSTRACT

A mandarin speech input method for directly translating arbitrary sentences of mandarin speech into corresponding Chinese Characters. The present invention is capable of processing a sequence of "mono-syllables," "(but each of the characters in the poly-character word is continuous)," "prosodic segments," or even a "whole sentence of continuous mandarin speech." A prosodic segment comprising one or more words is a segment that is automatically isolated by a speaker by pausing where characters in the prosodic segment are continuous.

35 Claims, 12 Drawing Sheets

OTHER PUBLICATIONS

Lee et al. A fully parallel Mandarin speech recognition system with very large vocabulary and almost unlimited texts. Circuits and Systems, 1991 IEEE International Symposium. 1991.

Gao et al. Tangerine: A large vocabulary Mandarin dictation system. ICASSP '95: Acoustics, Speech and signal processing Conference, 1995.

Chang et al. Improved syllable based continuous Mandarin Speech Recognition using intersyllable boundary models, May 1995.

Huang et al. A Mandarin Speech Dictation System Based on Neural Network and Language Processing Model, 1994.

Rabiner et al. Fundamentals of Speech Recognition, 1993.

Wang et al., "Tone Recognition for Continuous Mandarin Speech with Limited Training Data Using Selected Context–Dependent Hidden Markov Models", *Journal of the Chinese Institute of Engineers*, 1994, vol. 17, No. 6, pp. 775–784.

(a)

$C_1\ C_2\ C_3\ C_4\ C_5\ C_6\ C_7\ C_8\ C_9\ C_{10}\ C_{11}\ C_{12}\ C_{13}$

今天 早上 火車站 前面 人山人海

$W_1\ \ W_2\ \ \ W_3\ \ \ W_4\ \ \ \ W_5$ (b)

$W_1\ \ W_2\ \ \ W_3\ \ \ W_4\ \ \ \ W_5$

今天 早上 火車站 前面 人山人海

$P(今)\quad P(早|天)\quad P(火|上)\quad P(前|站)\quad P(人|面)$ $$P(W) = P(W_1, W_2, ..., W_m)$$

$$= P(\underbrace{C_{11}C_{12}\cdots C_{1S_1}}_{W_1}, \cdots, \underbrace{C_{i1}\cdots C_{iS_i}}_{W_i}, \cdots, \underbrace{C_{m1}C_{m2}\cdots C_{mS_m}}_{W_m})$$

$$= P(C_{11})P(C_{21}|C_{1S_1})\cdots P(C_{m1}|C_{(m-1)S_{m-1}})$$

$$= P(C_{11}) \cdot \prod_{i=2}^{m} P(C_{i1}|C_{(i-1)S_{i-1}})$$

*FIG. 7*

AN EXAMPLE OF THE METHOD TO COMBINE STATISTICAL CHARACTERISTICS WITH LINGUISTIC KNOWLEDGE OR RULES SUCH AS PARTS OF SPEECH, SEMANTICS AND SYNTAX TO GENERATE WORD GROUPS.

VARIOUS MANDARIN SPEECH INPUT STYLES:

(a) JIN-1, TIAN-1, ZAO-3, SHANG-4, WO-3, ZAI-4, HUO-3, CHE-1, ZHAN-2, CHIAN-2, MIAN-4, YU-4, DAO-4, WO-3, DE-5, LAO-3, SHI-1, (b) JIN-1 TIAN-1, ZAO-3 SHANG-4, WO-3, ZAI-4, HUO-3 CHE-1 ZHAN-2, CHIAN-2MIAN-4, YU-4 DAO-4, WO-3, DE-5, LAO-3 SHI-1

(c) JIN-1 TIA-1 ZAO-3 SHANG-4, WO-3 ZAI-4 HUO-3 CHE-1 ZHAN-2 CHIAN-2 MIAN-4, YU-4 DAO-4 WO-3 DE-5 LAO-3 SHI-1

(d) JIN-1 TIAN-1 ZAO-3 SHANG-4 WO-3 ZAI-4 HUO-3 CHE-1 ZHAN-2 CHIAN-2 MIAN-4 YU-4 DAO-4 WO-3 DE-5 LAO-3 SHI-1

*FIG. 9*

SYSTEM AND METHOD OF RECOGNIZING CONTINUOUS MANDARIN SPEECH UTILIZING CHINESE HIDDEN MARKOU MODELS

BACKGROUND OF THE INVENTION

The present invention relates to an intelligent Mandarin speech input method and an intelligent Mandarin dictation machine. The present invention is the improvement of R.O.C. patent application 82106686 filed by the applicant of the present invention. More accurate and convenient input of Chinese characters can be realized by means of Mandarin speech input in accordance with the present invention.

Today, the methods for entering Chinese characters into computers are numerous, for instance, those based on phonetic symbols, character radicals or strokes thereof. However, none of these methods have been recognized as the best, since no input method is really convenient to the users. Some input methods may be relatively slow, while other methods require special training, or require recall of numerous rules for character radicals which may be forgotten as a result of infrequent use. For instance, the "phonetic symbol input method" is readily practiced by everyone without substantial training, but this input method is still not popular due to its relatively slow speed. Currently, the fastest input methods for Chinese characters are probably the so-called Tsang-jiieh method, Ta-yi method or other similar character radical methods, but these methods can only be used by professionals who must have received long-term training. The inconvenience of these methods basically results from the fact that each of the Chinese characters has been irregularly translated into several radicals represented by key strokes of the typical English keyboard. Actually, the English keyboard was initially designed for alphabetic languages such as English and it is, therefore, inconvenient for non-alphabetic Chinese characters to be entered.

A possible method is to enter Chinese characters by means of speech, which has long been proposed. However, because the method of inputting Chinese characters by speech encounters some critical technical problems that are almost not solvable, almost no such method has been commercialized. The major technical problems thereof are:

(1) The necessary vocabulary for the Chinese language is too large for speech recognition technology. The number of Chinese characters commonly used are at least 5,000 and the number of commonly used Chinese words are at least 100,000 (including all mono-character and poly-character words) that are beyond the feasibility of available technology;

(2) Too many homonym characters and words exist in the Chinese language that may not be easily distinguished even if the pronunciation had been correctly recognized; and (3) It is difficult to translate Mandarin speech into Chinese characters in real-time, using low-cost devices, because the computation described in problems (1) and (2) can not be carried out in a very short period of time.

U.S. patent application Ser. No. 08/352,587 filed by the same applicant of the present invention can substantially mitigate the problems described above. The cited patent is incorporated herein by reference. The main contents of the patent is as follows:

(1) Mandarin mono-syllables are chosen as the acoustic units for recognition. Although the number of Chinese characters and words are huge, the number of different mono-syllables is limited to about 1,300 which can be realized by present speech recognition technology. The recognized syllables along with their preceding and following syllables together with some linguistic information can be used to decode the corresponding words and sentences constructed therefrom.

(2) Chinese language models can be established by means of the Markov Models based on Chinese text corpus. Numerous training texts are used to measure the probabilities with respect to each of the available characters preceded or followed by one or more other characters. These probabilities can be utilized to determine that if a particular syllable is preceded or followed by one or more other syllables, which character is most likely represented by the syllables in question. This method can solve most homonym problems, while the erroneous homonyms can then be manually corrected on the screen.

Based on the structure of the cited patent, the present invention has further developed two improved techniques.

(1) Use sub-syllable units as the acoustic units to generate "Hidden Markov Models" through special training algorithms such as an "Interpolation Training Algorithm", where the sub-syllable unit is an acoustic unit smaller than the syllable. Examples of sub-syllable units are the "initial" of a Mandarin syllable (the initial consonant), the "final" of a Mandarin syllable (the vowel or diphthong part including possible medials or nasal ending), and the phoneme such as a consonant and a vowel. These "Hidden Markov Models" along with "Tone Models", which deal with the characteristics of tone variation in Mandarin speech, "Search Algorithms and Pattern Matching Algorithms for Continuous Speech" are utilized to carry out improved recognition for Mandarin mono-syllables. In this way, the recognition technique can not only effectively recognize the "isolated mono-syllables", but also the "mono-syllables in continuous speech" in an accurate manner. The input speech of the user will not be limited to a sequence of "isolated mono-characters (mono-syllables). On the contrary, the input speech can also be "isolated words" (but the syllables in the poly-character words are continuous), "isolated prosodic segments" (the prosodic segment comprised of one or more words is the segment that is automatically segmented by the speaker to make a pause during his speech, where the syllables in the prosodic segment are continuous), or even the "whole sentence of continuous Mandarin speech".

(2) Based on a large amount of Chinese texts, calculate the probabilities with respect to the character (or word) adjacent to another character (or word) and the probabilities with respect to the character (or word) being present with another character (or word) in the same sentence. An improved "Chinese Language Model" can be constructed in accordance with the above probability information and the linguistic information or rules derived from wording and grammar analysis in the Chinese language. The improved "Chinese Language Model" augmented with an efficient search algorithm can be used to quickly distinguish the correct homonym character among all possible Mandarin mono-syllable candidates.

Both techniques are developed in view of the characteristics of Mandarin Chinese. These two techniques, when used together, can accurately recognize the "Chinese characters represented by continuous speech", so that users can conveniently and naturally enter speech in various formats. The required amount of computation will not be substantially increased, while the correct recognition rate may remain unchanged or even be improved. All techniques can be implemented by means of software which is easily incorporated into a computer or a DSP (Digital Signal Processing) board provided with a DSP chip (since such computers, chips and boards are available in the market, it is easy to develop various products through different computers, boards or chips). If the computation speed of the computer or the chip is fast enough and the memory space of the computer or the board is large enough, real-time input can be ensured. Such a board can be plugged into the slot of any AT (or above) personal computer. Therefore, it is very convenient for the users, and the cost can be dramatically reduced. Based on the fundamental techniques and features, the present invention further develops several "Intelligent Learning Techniques" to provide the dictation of the present invention with intelligence which can "learn" if taught. These techniques include: automatic learning of a user's voice so that new users can use the machine quickly; automatic learning of the user's environmental noise and adapting to such noise; and continuous on-line learning of the user's voice, special words, wording and sentence styles to increase the correct recognition rate. All these features will be explained in the detailed description of the preferred embodiment hereinafter.

SUMMARY OF THE INVENTION

The object of the present invention is to provide a Mandarin speech input system and method for translating sentences of Mandarin speech into corresponding Chinese characters. The system, in accordance with the present invention, is developed with a method of speech processing technology and is implemented in the form of a dictation machine in accordance with such technology. This machine can be "dictated" with arbitrary sentences of Mandarin. In other words, when the user utters arbitrary sentences of Mandarin, these sentences can be recognized and translated into characters by the dictation machine. These characters are then displayed on the screen of a monitor (in Chinese). This machine acts as a "secretary" which enters the Chinese characters into the computer after listening to the user's sentences. After these characters have been entered, subsequent procedures such as word processing, modification, editing, storage, print-out or transferring to a peripheral apparatus can be carried out. In short, this dictation machine enables the Chinese computer to "listen to" Mandarin speech. The machine, in accordance with the present invention, is different from the conventional Mandarin speech recognizer in the following ways:

(1) It can deal with arbitrary sentences constructed by a very large vocabulary (there are at least 100,000 frequently used words and at least 5,000 frequently used characters in the Chinese language) because the input to the computer can be arbitrary sentences.

(2) Characters can be entered in real time, i.e., the translation of a sentence into Chinese characters shall be completed once the user has finished saying the sentence, which will correspond to the typical real-time operation for input to the computers.

These two differences constituted the technical bottleneck for the commercialization of a Mandarin dictation machine. Therefore, almost no successful products have ever been on the market up to now. The existing "Mandarin speech recognition systems" developed by some research institutions are either capable of recognizing limited vocabulary (for example, 100 city names), or poor in recognition rate. These products which are still not convenient to the users are different from the machine in accordance with the present invention.

Because it is very difficult to realize the "Mandarin dictation machine" in terms of technology, the present invention accommodates the above concepts with several additional conditions, so that the above concepts could be technically feasible and implemented subject to the following three conditions:

(1) Speaker dependent: That is, a particular machine can only accept the speech of a particular user at a time. Every user must first speak to the machine so that his speech is used as the "Training Speech" for the machine. After the machine has been "trained" by the "Training Speech" of the particular user, the machine can then be adapted to the speech of the particular user. If the machine is then used by another user, the other user can utilize his set of "Training Speech" to re-train the machine. This process can be carried out without much difficulty as this machine can only be sued by one person at a time. Those users speaking with different accents can also use the machine because the machines can also be trained by the "Training Speech" with the accent.

(2) Mono-syllables shall be used as the acoustic units to be processed by the computer: mandarin is featured for "one syllable for one character", i.e., each character is pronounced as a mono-syllable. All mono-syllables thus may be recognized first, the corresponding characters, words and sentences can then be located from these recognized mono-syllables.

(3) Limited errors in the input of Chinese characters is allowable: In fact, errors may occur in any input method. When erroneous characters occur, they are displayed on a screen, the user can easily correct them directly on the screen. Under such conditions, it is estimated that about 150 Chinese characters per minute can be entered into the computer through the machine in accordance with the cited patent application, of which about 17 characters need to be corrected. Because the correction process is very convenient to the user, the "net input" will be about 110 characters per minute. Please note that the speed of the fastest input method currently available in Taiwan is about 110 characters or more, but this is only achieved by well-trained professionals who have received long-term training. However, the general public equipped with the machines, in accordance with the present invention, can reach this level.

Therefore, the major object of the present invention is to provide a Mandarin speech input method and the resultant Mandarin dictation machine for the general public, who can speak Mandarin, to conveniently and quickly enter Chinese characters without special training and without recalling the input rules.

BRIEF DESCRIPTION OF THE DRAWINGS

These and other objects and advantages of the present invention will become more apparent by reference to the following detailed description of the preferred embodiments, when read in conjunction with the accompanying drawings, in which:

FIG. 7 illustrates a block diagram of an approach of "Word-Class-Based Chinese Language Models" as disclosed in U.S. patent application Ser. No. 08/352,587;

FIG. 9 illustrates the various Mandarin speech input methods in accordance with the techniques of the present invention;

DETAILED DESCRIPTION OF THE PREFERRED EMBODIMENTS

Figure 1:
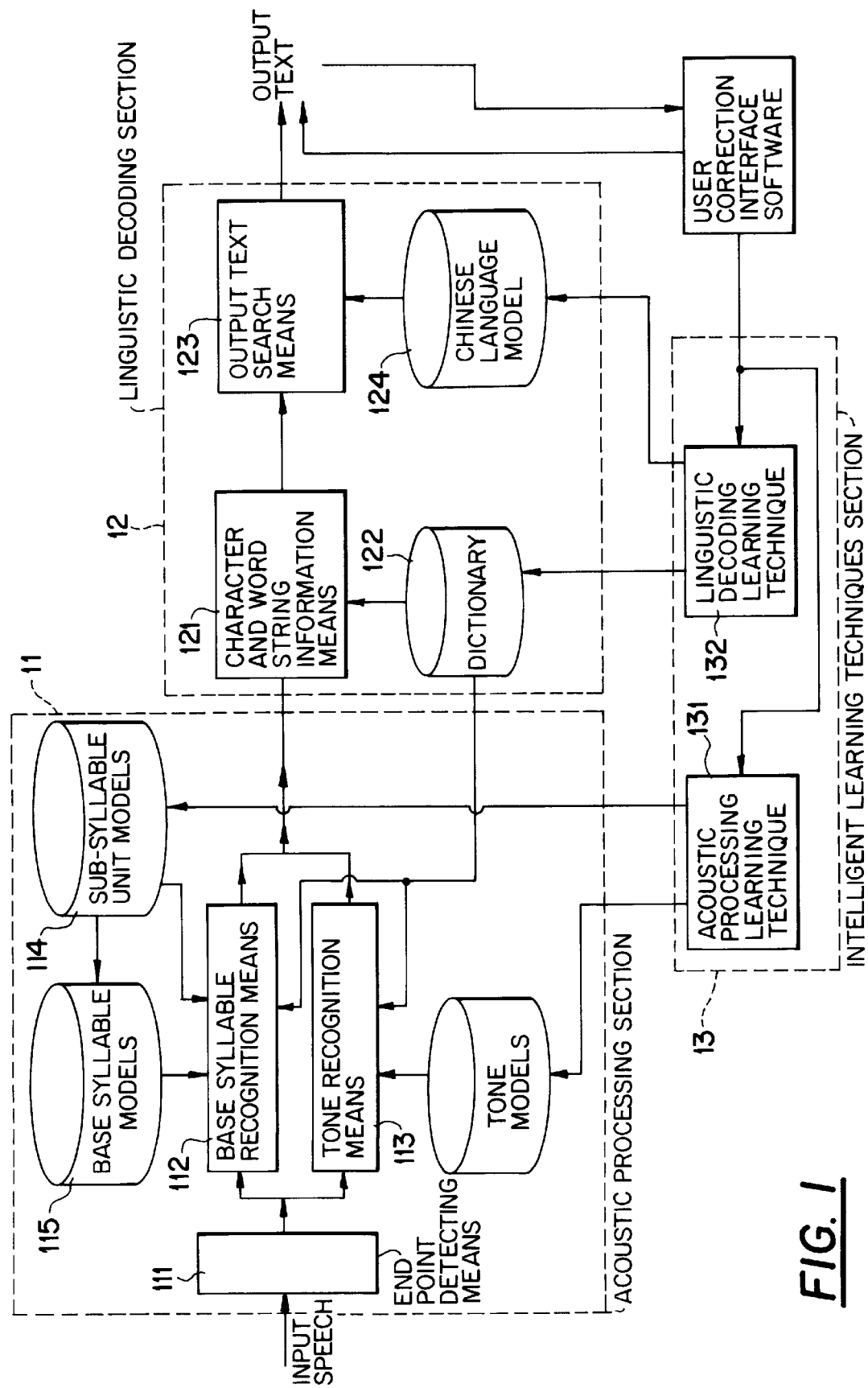
FIG. 1 illustrates the basic principle and structure of the present invention.

FIG. 1 shows the basic principle and structure of the present invention. The present invention mainly comprises an acoustic processing section 11 and a linguistic decoding section 12. The present invention further includes an intelligent learning section 13. The acoustic processing section 11 is responsible for recognizing a sequence of mono-syllables by means of acoustic signal processing. The linguistic decoding section 12 is used to identify the exact characters based on the recognized sequence of mono-syllables provided by the acoustic processing section 11. In the acoustic processing section 11, the endpoints of the input speech segments (such as mono-syllables, words, prosodic segments, or whole sentences) are first detected by an endpoint-detecting means 111 and then the detected speech segments are recognized by means of "base syllable recognition" means 112 ("Base syllable" means the syllable disregarding the tone, for example, recognition for "dian") and "tone recognition" means 113 (for example, recognizing the fourth tone for the above example). After the recognition of the input speech, the sequence of syllables is thus recognized as, for example, "dian-4 nau-3". The recognized sequence of syllables are then sent to the linguistic decoding section 12 so as to pick up the correct characters from the corresponding homonym sets, each including characters having the same pronunciation. In this section, all characters or words having the same pronunciation (or the homonym characters or words) are first selected by a "character and word string formation means" 121 in conjunction with a built-in dictionary 122. Then, the homonym character or word string with the maximum probability (or the highest likelihood) is located for output by means of an effective output text search means 123 used in conjunction with a "Chinese Language Model" 124.

If the output characters are incorrect, the user can correct them on the screen. After correction, not only the output text is corrected, but also the correction information is fed into an "intelligent learning section" 13 at the same time. The "intelligent learning section" 13 comprises two main techniques; an acoustic processing learning technique 131 and a linguistic decoding learning technique 132. The acoustic processing learning technique can further correct a "Sub-syllable Unit Models" 114 which is incorporated with the base syllable recognition means 112 and the linguistic decoding learning technique 132 can further correct the contents of the dictionary 122 and the "Chinese Language Model" 124. In this way, the whole system of the present invention can be further adapted to the voice, special words, wording and sentence style of the user.

The endpoint detection process, firstly carried out by the acoustic processing section 11 shown in FIG. 1 in accordance with the present invention, will now be described. This process is a well known technique to those skilled in the art of speech recognition. Basically, the waveform of input speech signal is sampled by an A/D converter integrated with a sample-and-hold circuit (not shown), and converted into a digital data stream which is then applied to the computer. With these digital data, the instantaneous energy (that is, the energy intensity in a very short period of time) and "zero-crossing rate" (that is, the number of transition of waveform from positive to negative or vice versa through the "zero level" in a unit of time) can be calculated by the computer. With these two feature parameters, the computer can judge the start and end of the speech signal, and discard the remaining noise. For instance, the instantaneous energy of the "final" of a Mandarin syllable (the vowel or diphthong part including possible medials or nasal ending) is significantly higher than that of noise; the instantaneous energy of the "initial" of a Mandarin syllable (the initial consonant) may not be high, but the "zero-crossing rate" is significantly higher than that of the noise. As a result, the noise and the speech signal can be effectively distinguished, and a further recognition of the speech signal can then be carried out separately.

The "base syllable recognition" process in the acoustic processing section will now be described. The total number of different mono-syllables in Mandarin is about 1300. If the differences caused by lexical tones are disregarded, the total number of base syllables in Mandarin will be reduced to about 408. For example, if "ba-1", "ba-2", "ba-3", "ba-4" and "ba-5" (here each of the numbers with a preceding hyphen indicates the tone of the syllable) are considered as five different mono-syllables, then the total number of different mono-syllables will be about 1300. If they are treated as one base syllable, the total number will be about 408. As the lexical tones are independently considered in the present invention, the input syllables are recognized relative to these 408 base syllables. After in-depth research for several years, it has been found that better results can be obtained by means of the sub-syllable based "Hidden Markov Models" generated through special training or the "Base Syllable Models" formed therefrom (reference number 115 shown in FIG. 1), where both models are developed to deal with the characteristics of Mandarin mono-syllables in accordance with the present invention. Because there are many confusing sets, for example, the a-set consisting of ba, pa, ma, fa, da, ta, na, la, ga, ka, ha, etc., such sets of mono-syllable candidates for speech recognition are very difficult to correctly recognize among the collection of the 408 base syllables of Mandarin disregarding the tones. The special training algorithm for the above "Sub-syllable Based Hidden Markov Models" 114 and "Base Syllable Models" 115 are developed according to the characteristics of Mandarin mono-syllables to correctly recognize Mandarin speech.

Figure 2:
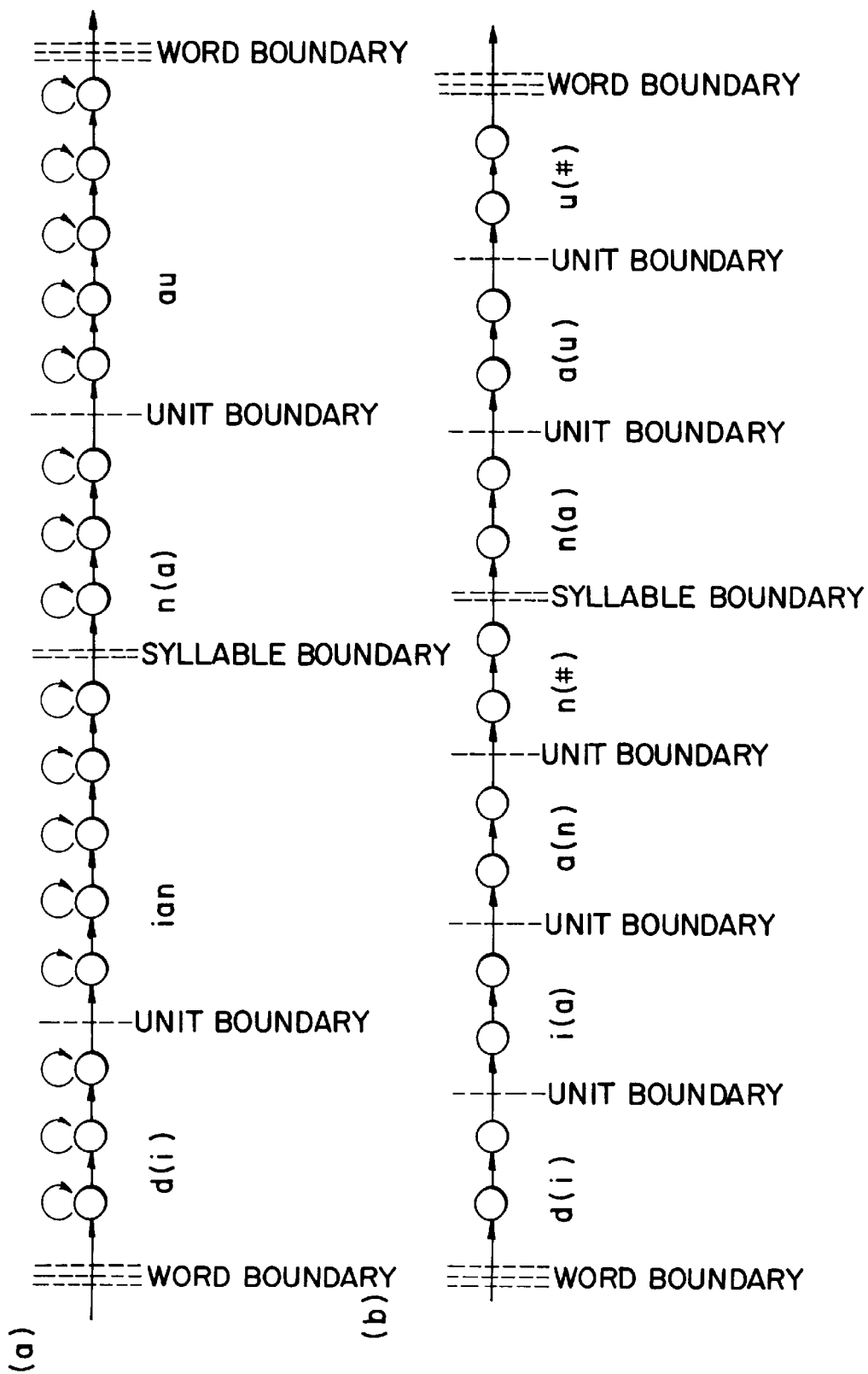
FIG. 2 illustrates two possible "sub-syllable units", in which one is formed based on the "initial" and "final" of a character, and the other is formed based on phonemes, where the base syllables "dian" and "nao" of the word "電腦" (dian-4 nao-3) (the number with the preceding hyphen indicates the tone of the mono-syllable) are used as an example.

In FIG. 2, two possible examples are used to explain the sub-syllable unit based "Base Syllable Models", and how these base syllables are connected into words or sentences. In FIG. 2(a), the "initial" affected by the starting phoneme of the following "final" thereof and the "final" without being affected by the preceding and following phonemes are used as a "sub-syllable units". Traditionally, each of the 408 base syllables in the Mandarin can be divided into the format of "initial"/"final" including 22 "initials" and 41 "finals" in total. For example, in "dian nau", "d" and "n" are "initials", while "ian" and "au" are "finals". In general, since the duration of the "initial" is relatively short and unstable, and the instantaneous energy of the "initial" is relatively small, the "initial" is easily affected by the following "final". On the contrary, since the duration of the "final" is typically long and the instantaneous energy of the "final" is higher, the "final" is hardly affected by the preceding "initial". In addition, because of the mono-syllable structure in Mandarin, it is reasonable assume that the "initial" is hardly affected by the "final" of the preceding syllable, and the "final" is hardly affected by the "initial" of the following syllable. Therefore, the adopted "sub-syllable units" in this case are the "initial" and "final". However, the "initial" must take the beginning phoneme of the following "final" into consideration, i.e., two "initials" with different beginning phonemes of the following "finals" are considered as different "initials". For example, two different "initials" are used in the "dian" and "duan", where initials "d(i)" and "d(u)" are considered as two different "d" followed by "i" and "u" respectively. In another example, the "initials" in "dian" and "ding" are almost the same "d(i)" even if the following "finals" "ian" and "ing" of the "initial" "d" are different, because the "starting phonemes" of the above two "finals" are the same "i".

On the other hand, the "final" will not consider whether the preceding or following phoneme is different or not. The "final" is typically comprised of several "phonemes" (for example, "ian" is comprised of three phonemes "i", "a" and "n"). With this concept, from Mandarin speech we can select a total of 154 "sub-syllable units" including 113 "initials" affected by the starting phoneme of the following "final" and 41 "finals" without being affected by the preceding and following phonemes. These "sub-syllable units" can be used to form the 408 base syllables in Mandarin. In this way, we can consider the effect of preceding and following phonemes on the intermediate phoneme to the utmost extent, while the total variables in the model is minimized to a reasonable amount that will facilitate the training for the model to be described below. We will now consider the exemplified two base syllables "dian" and "nau" of the word "電腦" (dian-4 nau-3) shown in FIG. 2. In FIG. 2(a), "dian" is comprised of two sub-syllable units "d(i)" and "ian", and "nau" is comprised of two sub-syllable units "n(a)" and "au". Because the component phonemes of "au" in "nau" are "a" and "o", the initial "n(a)" of "nau" is the same as the initial "n(a)" of "nan" since the component phonemes of "an" is "a" and "n". In fact, a continuous utterance of Mandarin speech can be treated as a sequence of such "sub-syllable units" affected by the preceding and following phonemes. Therefore, "Base Syllable Models" formed by these "sub-syllable units" may be used for base syllable recognition. Instead of forming "Base Syllable Models", these "sub-syllable units" may also be directly used for pattern matching in recognizing speech. The corresponding base syllables can then be located from the above matched sequence of "sub-syllable units". Of course, these "sub-syllable unit" models are also trained in accordance with the speech of the user. That is, the user must first utter several "training sentences" including these "sub-syllable units". The "Sub-syllable Unit Models" for the user are then trained in accordance with these "sub-syllable units" contained in the speech of the user.

In FIG. 2(b), the "phoneme affected by the following phoneme" is used as another example for "Sub-syllable Unit Models". For example, we consider two base syllables "dian" and "nau". The "dian" can be divided into four phonemes "d", "i", "a" and "n", each corresponding to an acoustic unit. Similarly, "nau" can be divided into three phonemes "n", "a" and "u". In this way, 33 phonemes can be located in Mandarin. However, each phoneme will be affected by the preceding and following phonemes in the same manner as the case shown in FIG. 2(a). In the case shown in FIG. 2(b), it is assumed that each phoneme is only affected by the following phoneme, because we assume that the effect of the preceding phoneme is small that it can be ignored. Another reason for ignoring the preceding phoneme is to minimize the variables in the models to a reasonable amount to facilitate the training for the models to be described below. Therefore, the "dian" is comprised of four sub-syllable units "d(i)" (the "d" followed by "i"), "i(a)" (the "i" followed by "a"), "a(n)" (the "a" followed by "n"), and "n(#)" (the "n" in the end of a mono-syllable, where "#" indicates the ending). If two phonemes with different following phonemes are treated as two different phonemes, then 149 "phonemes affected by the following phoneme" will be derived from the original 33 phonemes described above. We have found that the "phonemes affected by the following phoneme" is also an excellent "sub-syllable units" that can be used to form 408 base syllables in the Mandarin. These "phonemes affected by the following phoneme" are also suitable for recognizing base syllables in the continuous Mandarin speech. In fact, these two examples shown in FIG. 2 are only for illustration. Other "sub-syllable units" suitable for recognizing the base syllables in the continuous Mandarin speech can also be used. After the acoustic units (phonemes) have been carefully selected and the features of each acoustic unit affected by the preceding and following phonemes have been properly considered, the useful "sub-syllable units" can thus be developed. Because the "sub-syllable units" or the "Base Syllable Models" formed therefrom can be effectively used to recognize the base syllables in continuous Mandarin speech, the input speech may thus be isolated mono-characters, poly-character words or prosodic segments comprised of continuous mono-characters, or continuous sentences.

FIG. 3 illustrates the "tone models affected by the preceding and following tones" which is suitable for the tone recognition in the continuous Mandarin speech. Although there are five tones (including four lexical tones and one neutral tone), the variations of tones in continuous Mandarin speech are very complex. Since the tone features of each characters will be different due to the different tones of the preceding and following characters, a set of suitable "tone models affected by the preceding and following tones" shall be selected to describe the complex variations of the tones. If all possible situations of tone connection are considered, we require a total of 175 models comprising 5×5×5 models (for the case of intermediate characters in the sentence, in which 5 different tones each preceded by and followed by 5 different tones respectively resulting 5×5×5 models), plus 5×5 models (for the case of ending character in the sentence, in which 5 tones of the ending character each preceded by 5 tones resulting 5×5 models), plus 4×5 models (for the case of starting character in the sentence, in which 4 tones of the starting character each followed by 5 tones resulting 4×5 models since the neutral tone will not be present at the starting character), plus another 5 models (for the case of isolated pronounced characters). In fact, if the features of tones are carefully considered, the number of these models can be significantly reduced.

Figure 3A:
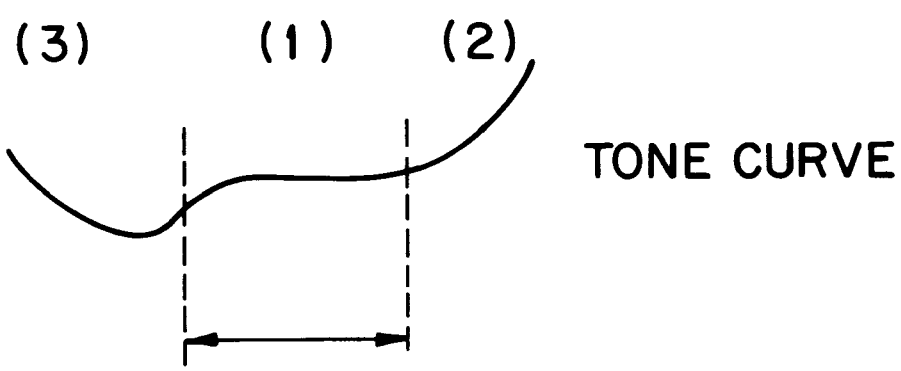
FIG. 3 illustrates an example of "Tone Models" in which the tone feature in the continuous Mandarin speech is affected by the preceding and following tones thereof.
Figure 3B:
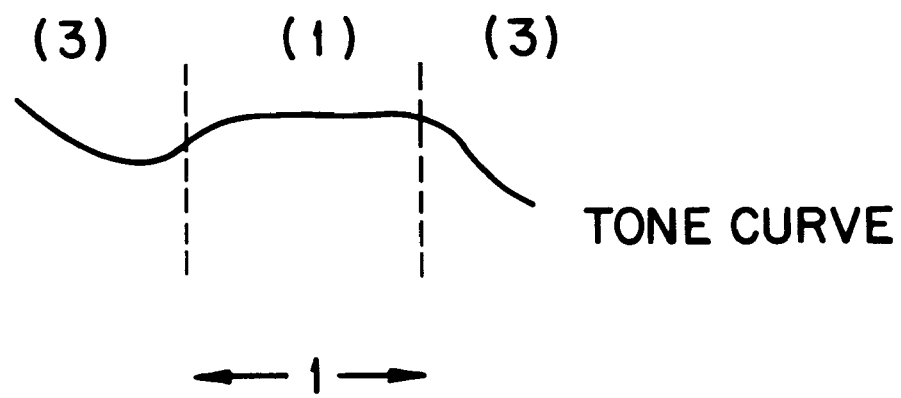

For the example shown in FIG. 3, the pitch curve (3)-1-(2) of FIG. 3(a) indicates the pitch curve of the first tone preceded by that of the third tone and followed by that of the second tone, and the pitch curve (3)-1-(3) of FIG. 3(b) indicates the first tone preceded by a third tone and followed by another third tone. From the pitch curves shown in FIG. 3(a) and 3(b), we can find out that the preceding third tone significantly affects the feature of the intermediate first tone, while the following second tone or third tone shown in FIG. 3(a) and 3(b) will not substantially affect the pitch curve. Therefore, the effects of preceding and following tones shown in FIG. 3(a) and 3(b) on the intermediate "first tone" can be described by one common model. If all such possible situations are considered, we have found that the 175 models described above can be reduced to about 23 models which can properly describe all complex variations of tones. In this way, the total number of models will be minimized to a reasonable number that will facilitate the training for the models to be described below.

We will now explain the "interpolation training algorithm" for the "Sub-syllable Unit Models" or "Tone Models" described above. Because these models basically use the "Hidden Markov Models", the training algorithm of the latter is well known to those skilled in the art. If these model are used for recognition of continuous Mandarin speech, the training data for mono-syllables (i.e., the speech that the user utters in advance to train the machine) may be used in first-stage training to generate the models suitable for recognition of mono-syllables. The models suitable for recognition of mono-syllables are then used as the initial models to carry out the second-stage training with the training data that the user utters in the format of continuous Mandarin speech. The obtained models are then used recursively as the initial models after this recursive training algorithm, the models suitable for recognition of continuous Mandarin speech are thus generated. However, because a large amount of training data for continuous Mandarin speech is usually required in the second-stage training of the above-mentioned training algorithm, it will be troublesome to a new user in training the dictation machine. One way to solve this problem is to reduce the number of the models so that each model can share more training data. This is why we minimize the variations of each model affected by the preceding and following phonemes (or tones) to reduce the total number of the models in the "Sub-syllable Unit Models" and "Tone Models" described above. Another way to solve the above problem is the "interpolation training algorithm". In other words, the models generated from each recursive training iteration of the second-stage recursive training mentioned above can be "interpolated" somewhat with the models generated from the first-stage training ("interpolation" is similar to the process of averaging and is also well known to those skilled in the art.), so that we can make full use of the precision of the models generated from the first-stage training to speed up the second-stage training. The required training data can thus be adequately reduced.

Figure 4:
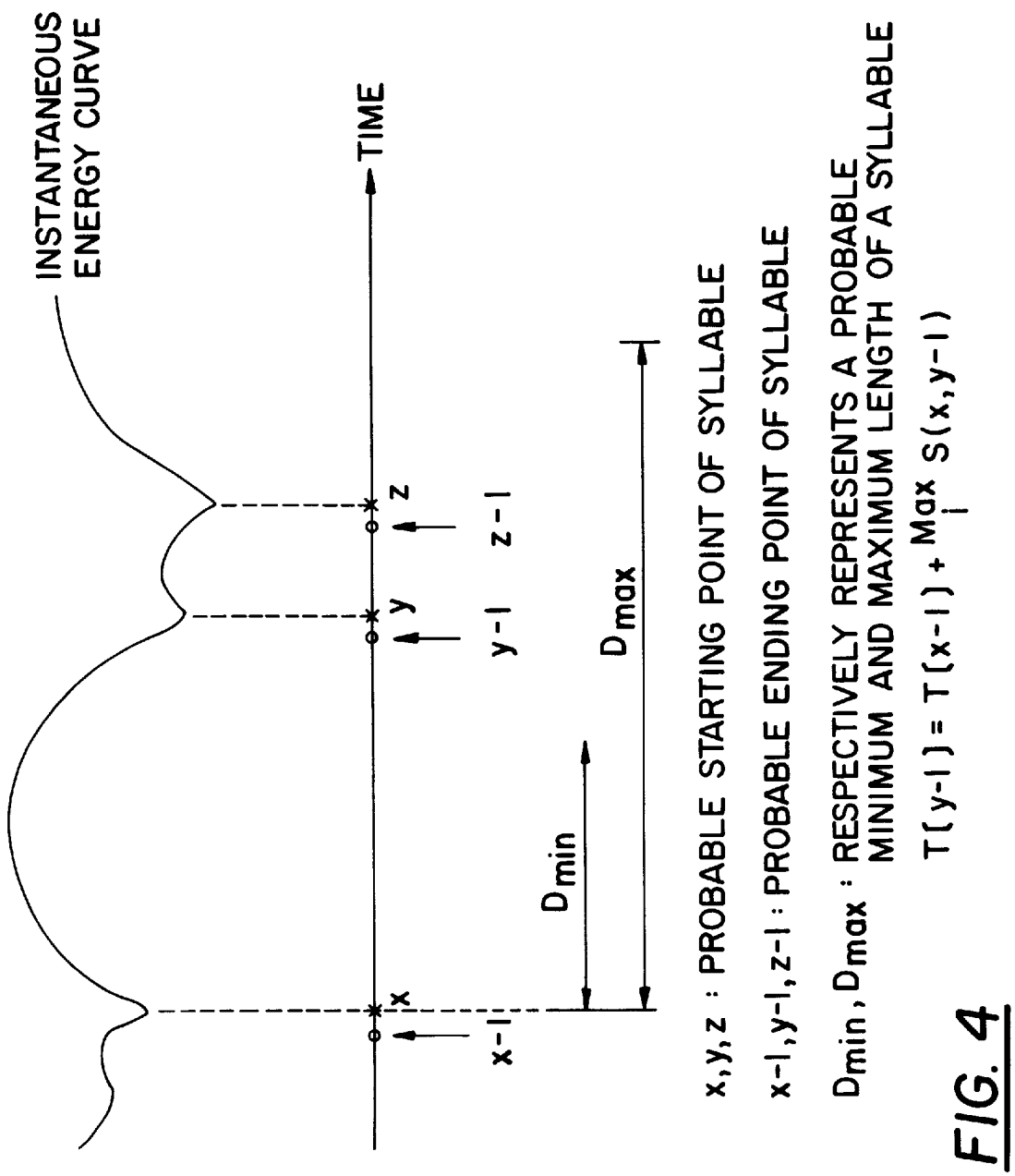
FIG. 4 illustrates the "Pattern Matching Algorithm for Continuous Syllables" in accordance with the present invention.

FIG. 4 illustrates how to use the above-mentioned "Sub-syllable Unit Models" or the "Base Syllable Models" formed therefrom and the "Tone Models" to carry out "recognition of base syllables" and "recognition of tone". FIG. 4 shows the instantaneous energy contour versus time axis, where the points (such as x, y, and z) with energy dips are possible starting points of the syllable. If x is the start of a syllable, then the possible ends y−1 and z−1 relative to the start x for this syllable can be located in accordance with the statistical upper limit $D_{max}$ and lower limit $D_{min}$ of the possible duration of a typical syllable. The "Dynamic Programming", that is well known in the art, can then be used to locate the combination of the most likely "base syllables string" and "tone string". For example, if the small segment of speech between x and y−1 is just a syllable, then this small segment of speech can be matched with each "Sub-syllable Unit Model" or the "Base Syllable Model" formed therefrom and each "Tone Model". A score can be calculated for each matching result. The highest-scoring combination of the "base syllable comprised of several sub-syllables" or the "Base Syllable Model" and the "Tone Model" represents the most likely mono-syllable of said small segment of speech between x and y−1. From the start to the end of the whole utterance of speech, we can calculate the scores for all possible starts and ends of all possible mono-syllables, and accumulate the scores of the above mono-syllables. For example, the accumulated score up to point x−1, T[x−1], are added to the highest score for the next small segment of speech between x and y−1, Max S(x, y−1), to result in the accumulated score up to point y−1, T[y−1]. In this way, after the computer has accumulated the scores of all possible syllables from the start to the end of the whole utterance of speech, the syllable string with the highest score can thus be located and used as the result of this matching process. It is the so-called "Pattern Matching Algorithm for Continuous Syllables" in accordance with the present invention.

Figure 5:
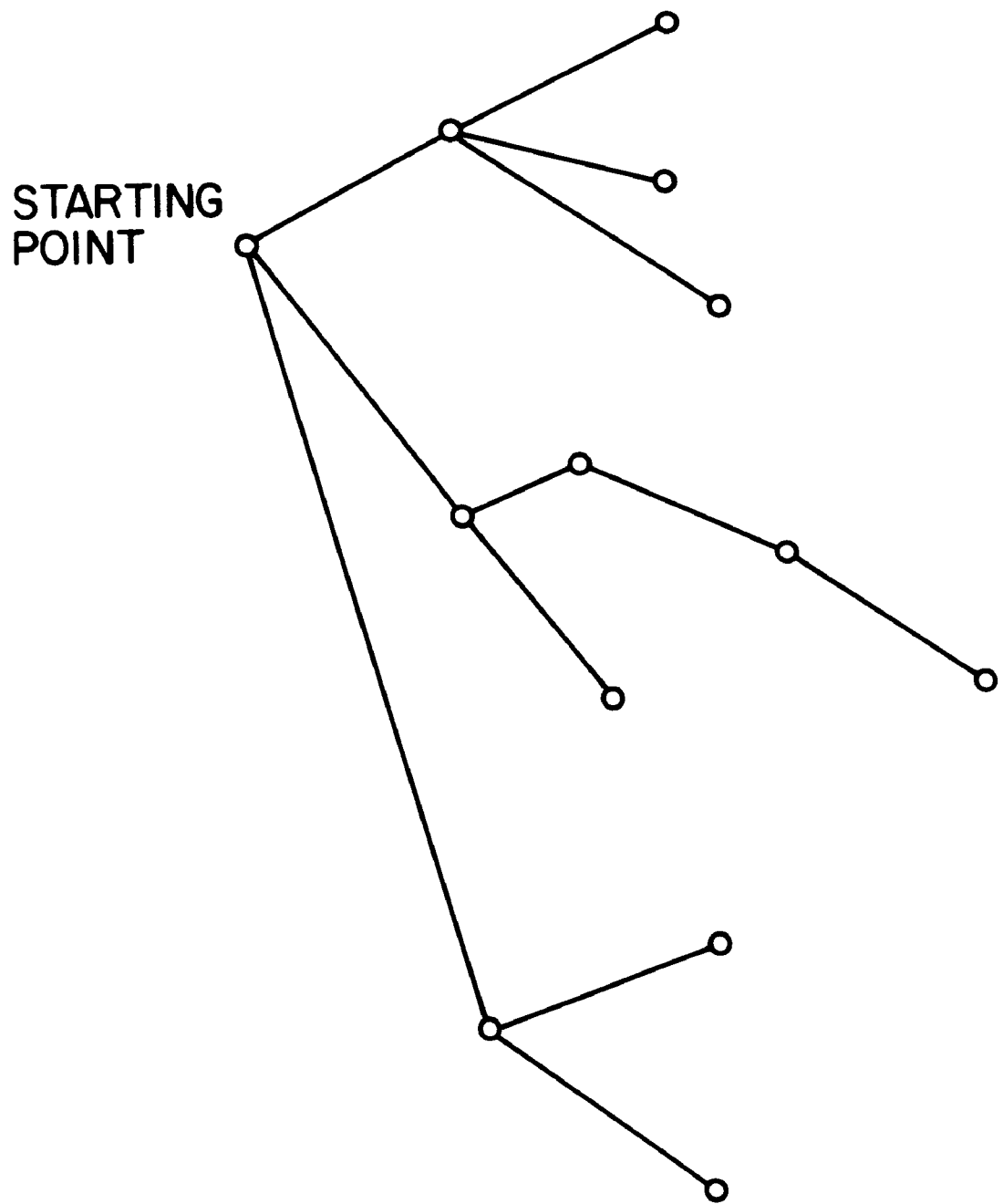
FIG. 5 illustrates the "tree dictionary data structure" used for "word-based Matching Algorithm for Syllables"

Except for the "Pattern Matching Algorithm for Continuous Syllables" described above, another important method is "Word-based Matching Algorithm for Syllables" in which the information from the dictionary is fully utilized to reduce the search and matching space and to improve the correct rate and efficiency. As shown in FIG. 5, a "tree dictionary data structure" representing all words in the dictionary is first set up in accordance with the order of base syllables (disregarding tones) or mono-syllables (with tones). FIG. 5 shows the case in which tones are not included, although the case that tone are included can also be used. Each node (circle) in this tree structure represents a base syllable. Moving along the branch from the root to a leaf, will generate a word, such as "聲生" (yi sheng) or "台北" (tai pei). Therefore, when the preceding syllable is "yi" or "tai", the following syllable is probably "sheng" or "pei" respectively. In this way, many base syllables that should be considered originally may not be considered any more. The necessary search and matching space are automatically reduced, while both the correct rate and recognition speed can be improved accordingly. The situation when the matching is performed in reverse order is similar. For example, if the following base syllable is "sheng" or "pei", then the preceding base syllable is probably "yi" or "tai", respectively. It is the "Word-based Matching Algorithm for Syllables" that fully utilizes the information from the dictionary to facilitate the recognition of mono-syllables. The "word occurrence frequency" information can also be included in this algorithm. In other words, those most frequently used words shall be considered in first priority to speed up the recognition and to improve the correct recognition rate.

We will now explain the principle of "Linguistic Decoding Section" shown in FIG. 1. When the base syllable string candidates and tone string candidates are provided by the Acoustic Processing Section, the "character and word string formation means" first selects all possible homonym characters of each mono-syllable or each possible homonym words by comparing with the characters and words in the "tree dictionary data structure". Please note that some mono-syllables are too confusing to be identified. For example, if the "Acoustic Processing Section" can not distinguish between "ting-1" and "tian-1" (FIG. 6) which are very similar, these two mono-syllables will both be treated as mono-syllable candidates and provided to the "character and word string formation means" 121. The "character and word string formation means" 121 will than provide all possible homonym characters of "ting-1" and all possible homonym words formed therefrom as well as all possible homonym characters of "tian-1" and all possible homonym words formed therefrom. At this time, the output from the "character and word string formation means" 121 comprises a huge "word lattice". Therefore, an effective "Chinese Language Model" is required in order to calculate the corresponding probabilities for each of the word candidates.

Figure 6:
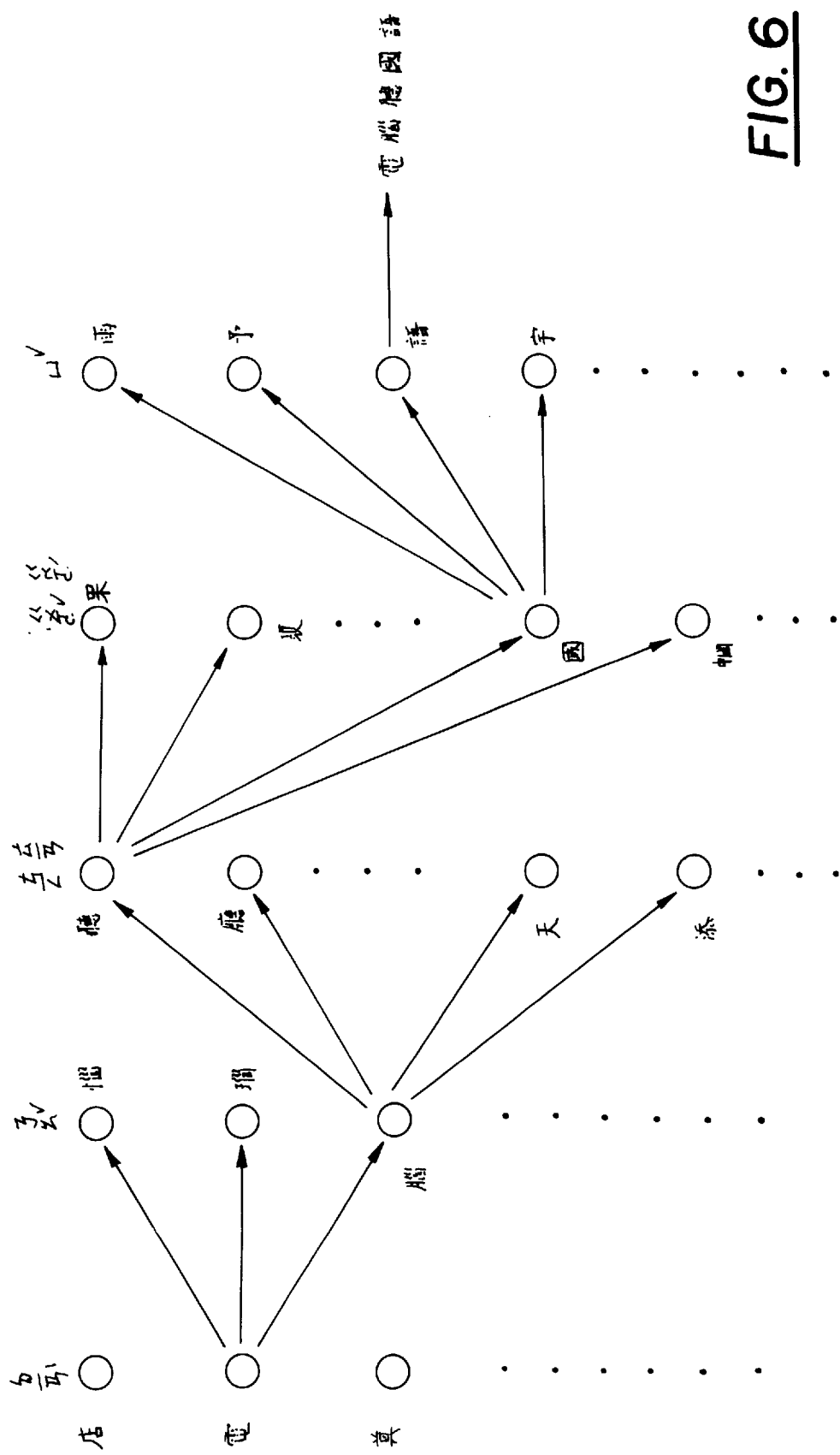
FIG. 6 illustrates a block diagram of the "Markov Language Models based on Chinese Text Corpus"

The training method of "Markov Chinese Language Models" (FIG. 6) disclosed in the cited patent will be recited as follows. For instance, if 20,000,000 characters of newspaper texts (in the format of a computer file) are entered into the computer as the "training text", the program in the computer will count the occurrence frequencies for all characters and words. For example, "中" (jueng-1) is present for 150 times, "中央" (jueng-1yang-1) is present for 32 times, "中國" (jueng-1 guo-2) is present for 28 times, etc. The probabilities for the occurrence of each character and the other possible characters adjacent to said character will be calculated by the computer program based on a particular formula. When the acoustic processing section produces a sequence of recognized syllables (phonetic symbols), the program of the Language Model has formulas to calculate the probability for linking each possible set of homonym characters into a sentence. For example, FIG. 6 shows that each of the mono-syllables "dian-4" and "nao-3" comprises many homonym characters respectively. But "電腦 (computer)" is the most probable combination of the homonym characters for the above two syllables. Similarly, while each of "quo-2" and "yu-3" comprises many homonym characters, but "國語 (guo-2 yu-3; Mandarin)" is the most probable combination of the homonym characters for the above two syllables. When all syllables shown in FIG. 6 are entered as "dian-4 nao-3 ting-1 guo-2 yu-3", the probabilities of the above five syllables with respect to "電腦聽國語 (The computer listens to the Mandarin)", "店腦聽國雨 (this combination is meaningless in Chinese)" and other possible combinations are calculated respectively. Finally, the highest probability is found for the character sequence "電腦聽國語", and the corresponding sentence will be chosen as an output. In other examples, the characters of Chinese textbooks for primary schools or texts printed in newspapers or magazines (already in the format of computer file) are entered into the computer as "training texts". The computer will calculate the occurrence frequency of each character to appear adjacent to other character(s) in such texts to establish the Language Models corresponding to the primary school textbook and newspapers or magazines respectively. In fact, every user may use the most suitable "training texts" to train and establish his own Language Model. For example, after a business reporter has used the business news in the newspapers to train his machine, the machine will be adapted to the input of business news. After a writer has used his previous works to train the machine, the machine will be adapted to the wording and sentence style of the writer, with higher correct recognition rate during dictation using the machine.

The above-mentioned "Chinese Language Model" can advantageously correct part of the errors generated by the acoustic processing section. If two mono-syllables are very confusing, the acoustic processing section can send both mono-syllables to the "Chinese Language Model" for further selection. For example, FIG. 6 shows "guo-3" ranking as the highest probability, "guo-2" ranking as the second highest probability, such that the resultant recognition output should be "guo-3" at this stage. However, since the above two probabilities are very close, the selection between "guo-3" and "guo-4" can be temporarily pending and these two confusing mono-syllables "guo-3" and "guo-2" will be treated as mono-syllable candidates and be sent to the following Language Model to calculate the probabilities with respect to contexts. Because the next syllable will be "yu-3", a much higher probability of "國語" relative to that of "果雨" will be calculated by the "Language Model". Therefore, "國語" will be finally selected to correct the possible error. This process is very similar to the situation when human beings listen to the Mandarin. We human beings will automatically determine the correct sentence for some confusing pronunciations in accordance with the context.

The number of characters and vocabularies that can be recognized by the dictation machine depends on the built-in dictionary as well as the characters and vocabularies contained in the "training texts". Once the dictionary and training texts containing more characters are entered, recognizable characters can be increased.

The "Chinese Language Model" described above is the disclosure of the cited patent. This "Chinese Language Model" is actually based on "character", that is, the probabilities of each "character" to appear adjacent to other "characters" is the major criterion for selection among characters. However, a Chinese sentence is actually composed by "words", each of which comprises one or more "characters". In fact, instead of "characters", the Chinese people usually use a "word" as a basic unit to compose a sentence. Referring to the exemplary sentence shown in FIG. 7(a), this sentence should be considered as the composition of five "words" than be considered as the composition of thirteen "characters". Better results can be obtained from the word-based "Chinese Language Models" that calculate the probabilities of a certain word to appear adjacent to other words as the criterion for selection among words. This is the basic concept of U.S. patent application Ser. No. 08/352,587 filed by the same applicant of the present invention that replaced the character-based "Chinese Language Models" with word-based "Chinese Language Models". Experiments have proved that this concept is correct and will effect better results.

The cited patent application has taught a "Word-Class-Based Chinese Language Models" as shown in the exemplary sentence of FIG. 7(b). The sentence "今天早上火車站前面人山人海 (people crowded in front of the train station this morning)" (jin-1 tian-1 zao-3 shang-4 huo-3 che-1 zhan-4 chian-2 mian-4 ren-2 shan-1 ren-2 hai-3) comprises 5 words; "今天" (jin-1 tian-1, today), "早上" (zao-3 shang-4, morning), "火車站" (huo-3 che-1 zhan-4, train station), "前面" (chian-2 mian-4, in front of) "人山人海" (ren-2 shan-1 ren-2 hai-3, people crowed). The conventional method will calculate the probability of co-occurrence of the word pairs. That is, the probabilities of "今天 (today)" associated with "早上 (morning)", "早上 (morning)" associated with "火車站 (train station)", "火車站 (train station)" associated with "前面 (in front of)", and "前面 (in front of)" associated with "人山人海 (people crowded)" should be calculated. However, the method of "Word-Class-Based Chinese Language Models" in accordance with the cited patent application will only calculate the probabilities of the beginning or ending character in any word associated with the ending or beginning character in the preceding or following words. For example, only the probabilities of "天" associated with "早", "上" associated with "天", "站" associated with "站", and "面" associated with "人" are calculated. This is because all words having "天" as the ending character can be grouped into a word class which includes "今天 (today)", "明天 (tomorrow)" and so on. Similarly, all words having "早" as the beginning character can also be grouped into another word class which includes "早上 (morning)", "早上課 (morning class)" and so on. The associativity of any word located in said one word class with any other word located in said another word class can thus be represented by the associativity of the ending character such as "天 (day)" with the beginning character such as "早 (morning)". For example, both "明天早上 (tomorrow morning)" and "昨天早自習 (yesterday's morning class)" can be represented by the same associativity of "天 (day)" with "早 (morning)". Therefore, the probability of the associativity of "天 (day)" with "早 (morning)" actually represents the possibility to associate one word class with another word class, instead of the unique associativity of "今天 (today)" with "早上 (morning)". According to this concept in accordance with the cited patent application, the associativity of any "ending character" with one of other "beginning characters", will still generate 5,000×5,000 combinations (assuming there are 5,000 frequently-used characters), requiring 5,000×5,000 corresponding probabilities which is the same as the Language Model based on character. Experiments have proven that much better results can be effected from the method in accordance with the cited patent application. In addition, the parameter of "word utilization frequency" is easily included in the word-class-based "Chinese Language Models" to further increase the correct recognition rate by selecting the most frequently used phrases in higher priority.

We have described two "Chinese Language Models" according to the cited application. One "Chinese Language Model" is based on "character" to calculate the probabilities of each "character" associated with any other "character"; the other "Chinese Language Model" is based on "word" to calculate the probabilities of the "ending character" of each word associated with the "beginning character" of any other word. We have found that the techniques of "Chinese Language Model" can be varied to implement different "Chinese Language Models" which after various proper combinations will accomplish excellent results. The major techniques include: (1) "Character", "word", or "word class" can all be used as the basic unit in the "Chinese Language Model". (2) The occurrence probability of a "basic unit", such as the occurrence probability of "character", "word" or "word class", can be calculated alone. The probability of one "basic unit" associated with another "basic unit", such as the probability of one "character" associated with another "character", one "word" associated with another "word", or one "word class" associated with another "word class", can also be calculated. In addition, the probability of one "basic unit" associated with another two "basic units" can be calculated. Even the probability of several "basic units", which are not associated with each other but all are present in the same sentence, can also be calculated. Also, all these different "Chinese Language Models" can be properly combined by summing up the scores obtained individually with some weights. (3) The linguistic knowledge or rules, obtained from the analysis of parts-of-speech, syntax and semantics in Mandarin Chinese, may also be combined with the above "Chinese Language Models" obtained from the statistics of the text corpus using techniques (1) and (2) described above to generate improved "Chinese Language Models". The details of the above three techniques will be described as follows.

(1) "Character", "word", or "word class" can be used as the basic unit in the "Chinese Language Model". The method in accordance with prior art as shown in FIG. 6 uses "character" as the acoustic unit. The method in accordance with the U.S. patent application Ser. No. 08/352,587 as shown in FIG. 7(a) uses the "word" as the acoustic unit to calculate the probability of one word associated with another word, such as the probability of "今天 (today)" associated with "早上 (morning)", "早上 (morning)" associated with "火車站 (train station)", or "火車站 (train station)" associated with "前面 (in front of)". The method in accordance with the above application as shown in FIG. 7(b) uses word class as the basic unit to calculate the probability of the ending character of one word class associated with the beginning character of another word class. For example, all words with "天 (day)" as the ending character, such as "昨天 (yesterday)" and "明天 (tomorrow)", can be included in one word class. Similarly, all words with "早 (morning)" as the beginning character, such as "早晨 (morning)" and "早自習 (morning class)", can be included in another word class. The associativity between the above two rod classes can be represented by "天 (day)" associated with "早 (morning)". Therefore, "天 (day)" associated with "早 (morning)" also represents other situation including "明天早上 (tomorrow morning)". In fact, the above method includes some words with "similar linguistic characteristics" in one "word class" and use the "word class" as the basic unit. We also found that various methods can be used to cluster some words with "similar linguistic characteristics" into one "word class". Except the "word class" that includes the words with the "same ending character" or the "same beginning character" described above, the words with the same syntactic characteristic (such as the transitive verb with a single object), the same semantic characteristics (such as nouns indicating some animals) or the same statistical characteristics (such as words preceded by or followed by the same words) can also be clustered as one "word class". All these word classes can be used as the basic unit in the "Chinese Language Model" to calculate the corresponding probability. The concept of the cited patent application to cluster the words with the "same beginning character" or the "same ending character" in one word class is just an example for illustration.

Figure 8:
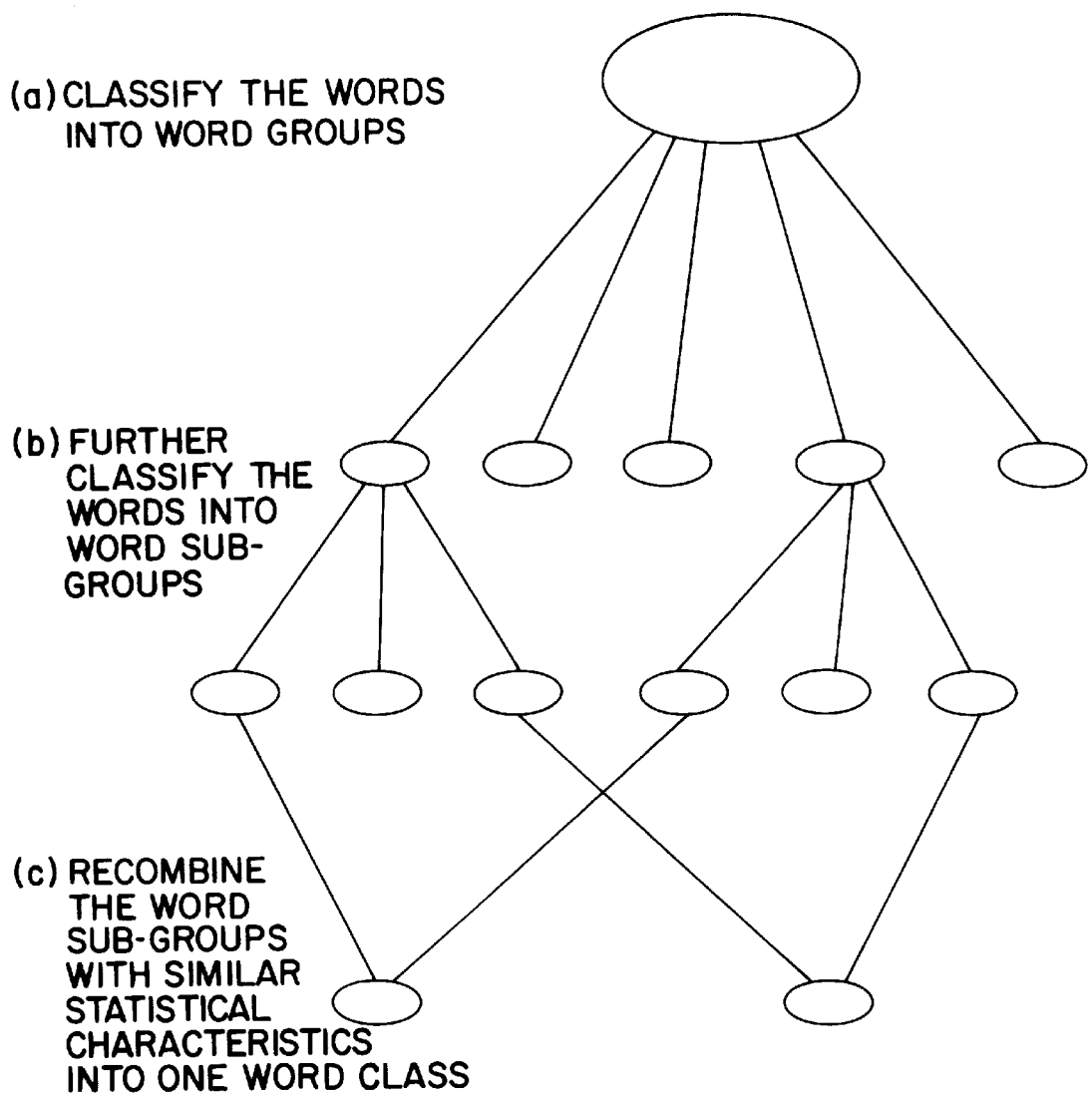
FIG. 8 illustrates an example to show the new approach to group all the words in the dictionary into "word classes" in accordance with statistical features and linguistic knowledge or rules such as the parts of speech, grammar and semantics.

FIG. 8 illustrates an example process to classify Chinese words into "word classes". In the first step, all words are classified into small word groups each of which has some common parts-of-speech, semantics and syntax in accordance with linguistic knowledge such as parts-of-speech (for example, verb, adjective and preposition), semantics (for example, the "verb representing status" such as "好像 (resemble)", or the "noun indicating the role of a human being" such as "老師 (teacher)", and syntax (for example, the "transitive verb followed by two objects" such as "給 (give)", or the "compound noun comprised of two nouns" such as "台北市長 (Mayor of Taipei)". In a second step, the words, which were classified into any of the word groups having consistent parts-of-speech, semantics and grammar during the first step, are further divided into smaller word sub-groups with consistent statistical characteristics in accordance with the statistical characteristics obtained from the Chinese text corpus (such as the preceding words, the following words, and the word-pairs that tend to be present in the same sentence (for example, the words "醫生 (doctor)"/"檢查 (diagnose)", and "警察 (police)"/ "調查 (investigate)" are not necessarily adjacent to each other, but will very often be present in the same sentence.)). In a third step, because the resultant word sub-groups obtained in the second step may be too small, some word sub-groups, that were divided in the first step due to the difference in parts of speech, semantics or syntax, can be recombined into a word class if said word sub-groups are really similar in statistical characteristics. The above process is just one example in which all words are clustered into some well-defined "word classes". In fact, it is understood that there are various clustering methods for "word classes". Different methods will generate different "word classes" which can be used as the basic units in the Chinese Language Model. However, a successful "word clustering" method will result in successful "Chinese Language Model". In fact, the "Chinese Language Model" may calculate the probabilities of different basic units including "character", "word" and "word group". The results of the above calculations can then be adequately combined to achieve a better final result by some weighted summation.

(2) The occurrence probability of an a "basic unit" can be calculated alone. For example, if the "character", "word" or "word class" is used as the basic unit, then the "character", "word" or "word class" with highest probability can be considered or selected in first priority. In addition, the probability of one basic unit associated with another basic unit can be calculated. For example, the frequency of "one character associated with another character" or "one word class associated with another word class" used in the Chinese text corpus can be calculated, which was also used in the cited patent and patent application. In fact, three basic units associated with each other, such as "我 (I)" "要 (want)" followed by "去 (to go) and "在 (in)" "火車站 (train station)" associated with "前面 (in front of)", are also useful information. Therefore, the statistical information of the associativity among three basic units are also useful. Additional statistical information of several basic units that are not associated with each other, but may be present in the same sentence, such as "醫生 (doctor)"/ "檢查 (diagnose)" and "警察 (police)"/"調查 (investigate)", can also be used in the "Chinese Language Model". Similarly, each level of statistical information, including the occurrence probability of a single basic unit, the probability of one basic unit associated with another basic unit, the probability of three basic units associated with each other, and the probability of several basic units that are not associated with each other but are present in the same sentence, can also be calculated respectively and may be adequately combined in the "Chinese Language Model" to accomplish a better result.

(3) The linguistic knowledge, information or rules, obtained from the analysis of parts-of-speech, syntax and semantics in Mandarin, may be combined with the information obtained from the statistics using the above two techniques to generate the improved "Chinese Language Model". In fact, the method in FIG. 8 for clustering all words into "word classes" is one example that combines the linguistic information with statistical information to carry out that classification. Other examples can also work well. For example, if the preceding work is "把 (let)", then the following words are most likely to be "把什麼東西做了什麼事 (let+noun+do)". In this case, the following word candidates will be automatically reduced. If the following character is "(le-5) (a Chinese function word which does not have another homonym character", then the preceding words are most likely to be "如何如何了 (adverb+ adjective+le-5)". Therefore, the preceding word candidates will also be automatically reduced.

In summary, various techniques for "Chinese Language Model" can be combined in various formats so as to accomplish the best results. Various techniques are available to effectively apply the resultant "Chinese Language Model" to the "word lattice" provided by the "character and word string formation means" so as to locate the correct output text. Since the recognized mono-syllables may be incorrect, each mono-syllable may comprise several mono-syllable candidates or confusing mono-syllables. Therefore, several "base syllable string candidates" and "tone string candidates" may be provided to the "character and word string formation means". The "word lattice" output from the "character and word string formation means" may include the homonym characters and words comprised of confusing mono-syllable candidates. Therefore, it is not easy for the "Chinese Language Model" to search the homonym characters and words for output texts. The techniques available for the "Chinese Language Model" includes at least the following items.

(1) Each mono-syllable along with its score given in the recognition process is provided by the "Acoustic Processing Section". The characters or words comprised of the mono-syllables with high scores shall be considered with higher priority.

(2) The mono-syllable may also be treated as a basic unit in the "Chinese Language Model" described before. Therefore, the occurrence probabilities of each monosyllable, each mono-syllable associated with another monosyllable and three mono-syllables associated with each other can be calculated. Once these probabilities have been adequately calculated and combined, the characters or words with higher scores shall be considered with higher priority.

The above two items are also important techniques to be used in the "Chinese Language Model" to search and locate the output texts from the word family candidates.

The "Acoustic Processing Section" and the "Linguistic Decoding Section" described above are two fundamental techniques in accordance with the present invention. With these two fundamental techniques, the system in accordance with the present invention can process the input speech in the formats including the "isolated mono-characters (monosyllables), the "isolated words each comprised of one to several characters with continuous speech within the word", the "isolated prosodic segments each comprised of several characters with continuous speech within the segment", and even the "whole sentence of continuous Mandarin speech". An exemplary text "今天早上我在火車站前面遇到我的老師 (jin-1 tien-1 zao-3 shang-4 wo-3 zai-4 huo-3 che-1 zhan-4 chian-2 mian-4 yu-4 dao-4 wo-3 de-5 lao-3 shi-1, I met my teacher in front of the train station this morning) is shown in FIG. 9 to explain the difference among the four formats of input speech uttered by the user.

As shown in the bottom portion of FIG. 1, the "Intelligent Learning Section" 13 developed in accordance with the present invention, which can further equip the dictation machine with "intelligence" that can "learn" if required, will be described now.

The first learning technique is automatic learning of the user's voice by means of "learning sentences" arranged in several stages (i.e., a set of "phonetically balanced learning sentences" especially designed for several stages). Once the new user has pronounced the first subset of learning sentences in the first training stage, the machine will preliminarily complete the learning of the user's voice. This is because this subset of learning sentences already includes all the "sub-syllable units" used in the Mandarin. For example, once the mono-syllable "ba" has be pronounced, the machine can also learn the "initials" in the mono-syllables such as "bao" and "ban" as well as the "finals" in the mono-syllables such as "pa" and "ma" at the same time. In this way, the machine can thus learn all possible pronunciations from this subset of learning sentences. Also, the more frequently used pronunciations will have more chances to be present in this subset of learning sentences to result in more correct training. This is the reason that the machine can complete preliminary learning from this subset of learning sentences. At a second training stage, if the new user is willing to pronounce another subset of learning sentences, the correct recognition rate can be further increased significantly. This is because the other subset of learning sentences have already included the most frequently used 200 basic mono-syllables, in such a manner that the most frequently used mono-syllables will have more training utterances to result in better training. For example, a frequently used syllable "ta-1", that has been trained by means of the "initial" of "tao-1" and the "final" of "ba-1" in the training sentences for the first stage, may not have been well trained in the first stage. However, the syllable "ta-1" will be present for several times in the second subset of learning sentences in the second stage so as to result in better training and higher correct recognition rate. In the third training stage, if the new user is willing to pronounce the third subset of learning sentences, the correct recognition rate can be further increased. This is because these "learning sentences" used in the third stage have included all 408 base syllables of Mandarin (the tones are not considered at this stage), in such a manner that frequently used mono-syllables will have more chances to be present and to be trained with higher accuracy. At a fourth training stage, if the new user is willing to pronounce fourth subset of training sentences, the correct recognition rate can be further increased. This is because the fourth subset of learning sentences have included all 1300 mono-syllables including different tones (for example, "ba" actually includes 5 variations: "ba-1", "ba-2", "ba-3", "ba-4" and "ba-5"), in such a manner that all mono-syllable with allowed tonal variations will be present and the frequently used mono-syllables will have more chances to be present and to be trained with higher accuracy.

The second learning technique is to automatically on-line learn the user's voice by the machine in real-time. In fact, it is not necessary for the user to start using the machine after the above-mentioned four stages have been completed. After the first stage of training has been completed, the user can use the machine at any time at the price of a lower initial correct recognition rate. Regardless of whether the machine is trained with learning sentences described above or is in practical use, "on-line" real-time learning can always be immediately carried out at any time by the machine if it is instructed and the errors are corrected by the user. In other words, all recognized speech signals can always be learned by the machine during operation. Therefore, if the machine continues to be used and the learning function is operating, the correct recognition rate can be continuously increased to about 95%–97%, that is, one error requiring correction for every 20–35 characters.

The third learning technique is to automatically on-line learn the environmental noise. Every user's environment will generate inevitable noise with different characteristics which will degrade the recognition rate. In the process of "on-line learning of user's voice" described above, the characteristics of environmental noise can in fact also be automatically learned by and adapted to the machine. After a period of learning time, the machine will work well under the given environmental noise.

In fact, the above three learning functions are technically performed with identical principles. The voices from many different speakers will be firstly used to train the "Hidden Markov Models" for the "sub-syllable units" (no matter what type of "sub-syllable unit" is selected) and the "Tone Models". Because the voices from different speakers will be different, the same "sub-syllable unit" pronounced by these different speakers will also be significantly different. In the "Hidden Markov Models" for the "Sub-syllable Unit Models" and the "Tone Models" with multiple speakers, a larger amount of Mixtures of Gaussian Probabilities is required to include different feature parameters generated by different speakers pronouncing this same sub-syllable unit. When a new user pronounces this "sub-syllable unit" with its "tone", an algorithm will be used to select several Mixtures of Gaussian Probabilities, with feature parameters similar to those of the new user, from the group of Mixtures of Gaussian Probabilities in the "Hidden Markov Models" for multiple speakers. Other Mixtures of Gaussian Probabilities will be de-emphasized. The built-in "Hidden Markov Models" is now adapted to the new user's "Hidden Markov Models". If the voices of the new user are continuously entered, these new voices can be included to calculate new Mixtures of Gaussian Probabilities, and so on. When more features from the new user's voice are included in the "Hidden Markov Models" (including "Sub-syllable Unit Models" and "Tone Models"), the new user's voice can be better described by the "Hidden Markov Models". If environmental noise exists, the noise mixed with new user's voice will be entered. Therefore, the noise will also be averaged into the Models, and the resultant Mixtures of Gaussian Probabilities will automatically include the feature parameters of the environmental noise as the background of the voice. The trained "Hidden Markov Models" will thus be adapted to the environmental noise with such features included in the parameters. Please note that the mathematical computation of the above processes is simple enough for fast calculation and is suitable for "on-line" real-time learning. In other words, when the machine is being used by the user, the voice and the environmental noise is immediately averaged into the Models. The new Models will be then used to recognize the next pronunciation. The effect of "on-line real-time learning" can thus be quick and significant.

The fourth learning technique is to automatically on-line learn the user's special words, wording and sentence style. Basically, every user has his own special words, wording and sentence style. In fact, many errors are generated because the machine does not know user's such special words, wording and sentence style. While the user is using the machine and correcting the errors on line, the machine can immediately learn the special words, wording and sentence style being present in the entered sentences of the user. That is, not only the new special words can be added to the lexicon of the machine, but the important parameters such as word/word-class occurrence frequencies and the probabilities of associativity between the corresponding characters/words/word classes in the Language Model will be immediately updated, and the Model will be automatically adjusted in real-time. The machine has thus learned the user's special words, wording and sentence style, and so on.

The fifth learning technique is the short-term cache memory. If a block of text dealing with a particular topic is being entered, some specific words, wording and sentence style may be repeatedly present. After an on-line correction, some specific information including word/word-class occurrence frequencies and probabilities of associativity between two characters/words/word classes can be stored in the short-term cache memory by the machine for use in the immediate future in top priority. Therefore, the correct recognition rate will be improved significantly when more texts for the same topic are entered. If the input texts are changed to other topics, the information in the short-term cache memory can be completely cleared.

Figure 10:
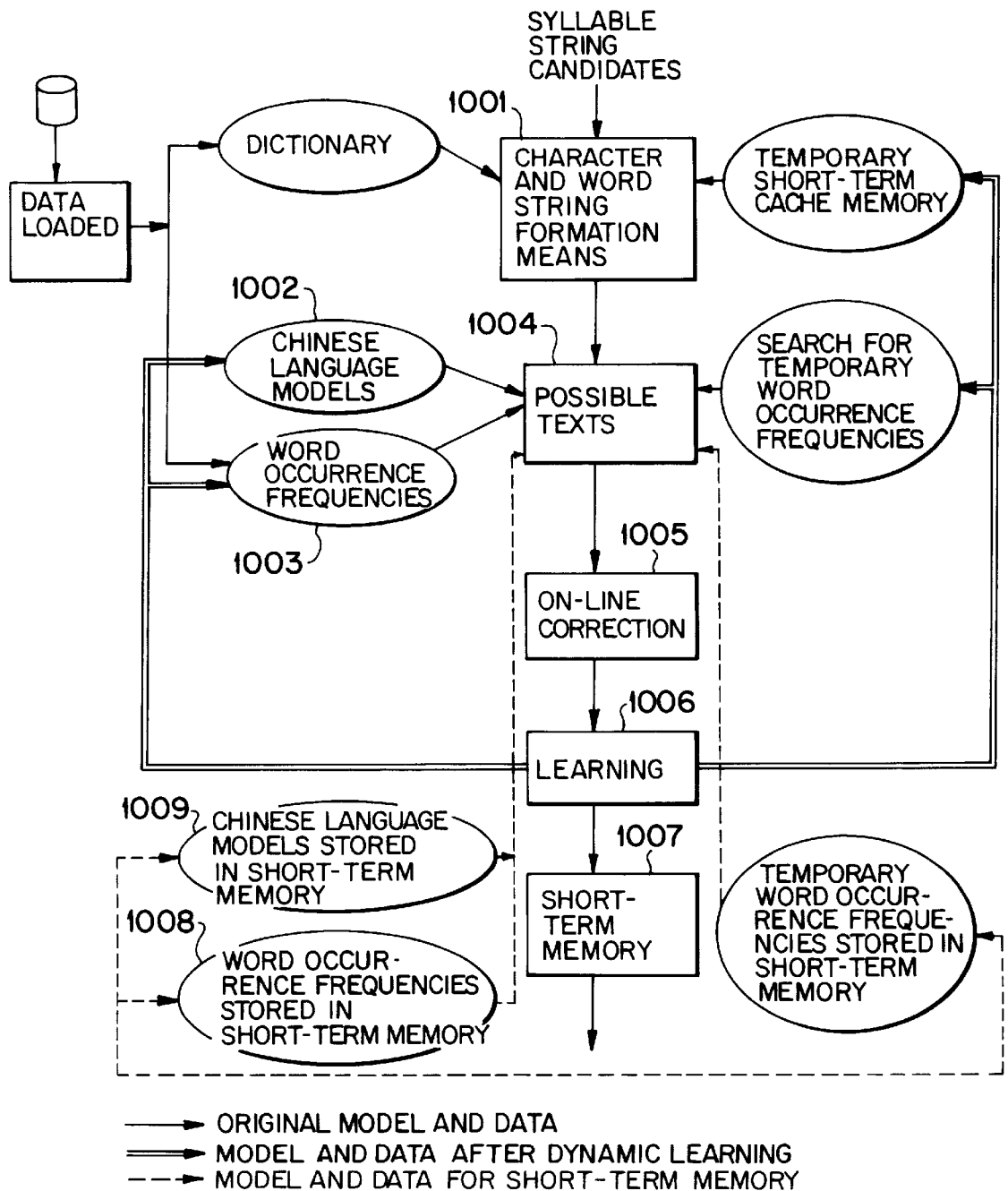
FIG. 10 illustrates a detailed example of the possible implementation in accordance with the intelligent learning techniques of the "linguistic decoding section"

One embodiment of the fourth and fifth learning techniques is shown in FIG. 10. When the recognized sequence of syllable candidates is provided by the acoustic processing section, all possible characters and word string candidates are generated by the character and word string formation means (step 1001) by searching within global dictionary pre-stored in the computer. The "Chinese Language Models" (step 1002) and "word occurrence frequencies" (step 1003) are then used to locate the most likely sentence for output (step 1004). The user can make on-line correction (step 1005) for immediate learning by the machine. Said learning comprises a "long-term learning" and a "temporary short-term learning". The "long-term learning" corresponds to the calculations of the new word occurrence frequencies and the new probabilities in the "Chinese Language Model". The "temporary short-term learning" includes the establishment of a temporary short-term cache memory (step 1007) to store special new words and the word occurrence frequencies. After the input of the texts has been completed, the user may determine whether the temporary short-term cache memory and such new information should be included into the global dictionary and relevant language model parameters, or be cleared. Because some particular words or sentence styles are repetitively present in a text dealing with a specific topic, the learning effect will not be significant if the learning is based only on the global dictionary and global Language Model. This is because these particular words and sentence styles only have a higher presence in this current text, and they can not greatly affect the global word occurrence frequencies and probabilities of associativity between two word classes and so on. This is why an additional short-term memory is provided in accordance with the present invention, as shown in the bottom of FIG. 10. The specific new words, word occurrence frequencies (step 1006) and probabilities of associativity between two word classes and so on calculated for this text (step 1009) will be stored in this short-term memory. When new sentences are entered into the machine, the machine will first access the short-term memory. If the short-term memory does not include the required information, then the machine will access the global language model and global dictionary. The specific new words and sentence styles of the text will thus be learned immediately, and the correct recognition rate will be improved when more sentences concerning the same topic are entered. Because the contents in the short-term memory can be completely cleared if another text dealing with different topic is entered, the next input will thus not be affected.

Some other techniques in accordance with the present invention will be described now. One of them is the technique to automatically select the "learning sentences". As described before, a specific set of "learning sentences" is designed in accordance with the present invention. The new user can train the machine to be adapted to his voice by simply pronouncing the minimum number of sentences, which is the set of "learning sentences". This specific set of "learning sentences" is actually selected by the computer from a collection of text files.

Figure 11:
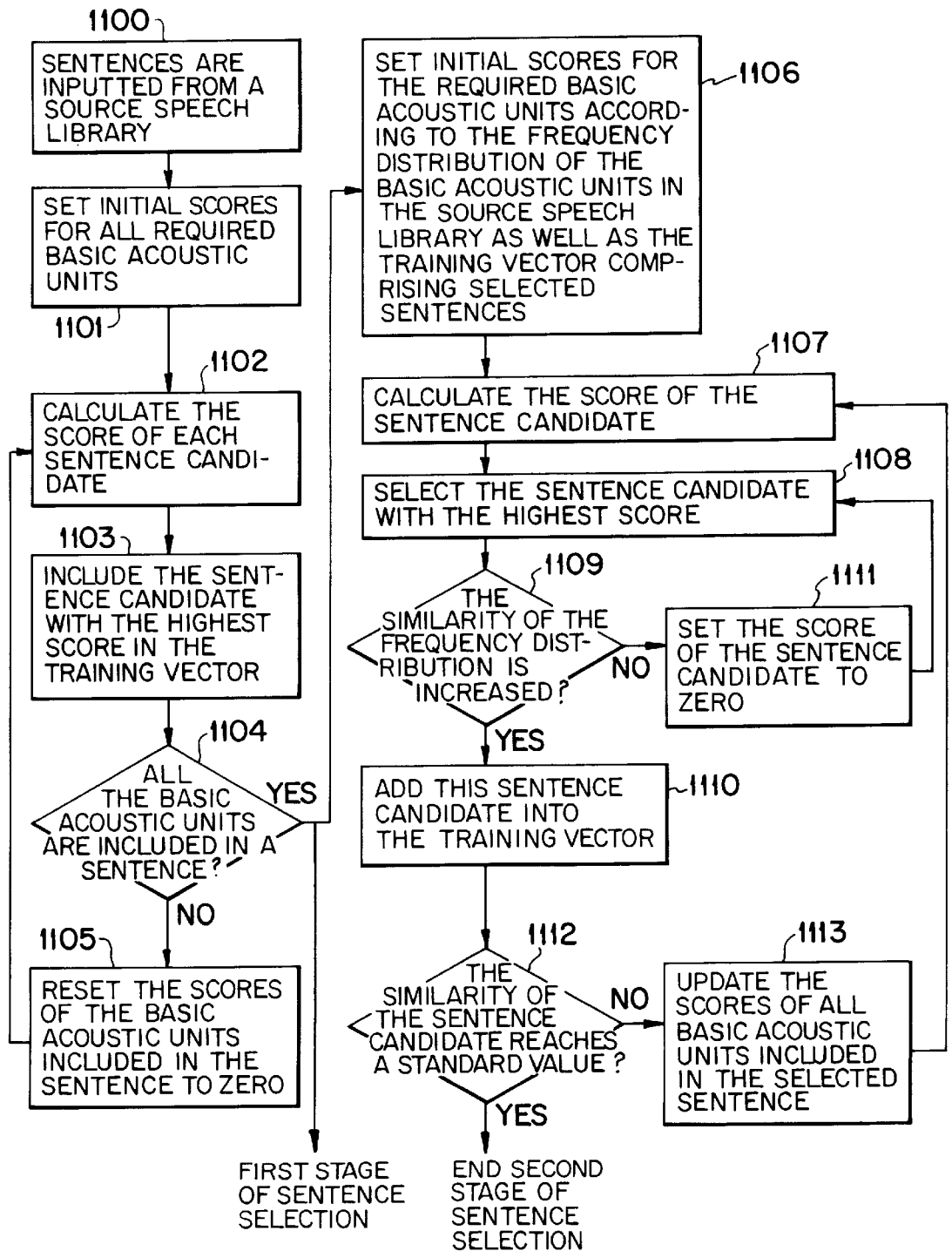
FIG. 11 illustrates a flow chart for automatic selection of the "learning sentences" by the computer in accordance with the present invention.

FIG. 11 is the flow chart for automatic selection of "Learning sentences" by the computer. The sentences are inputted from a text corpus (step 1100). The selection procedures are divided into two stages. The first is to set some particular scores for all required basic acoustic units (step 1101) (including "initials", "finals", sub-syllable units, transitions between "initial" and "final", tones, mono-syllables, base syllables, and so on). Then the total score of each sentence in the text corpus can be calculated in accordance with the individual scores of the basic acoustic units (step 1102). A sentence including more different basic acoustic units will get a higher total score and will be selected with a higher priority (step 1103). In other words, other sentences including these reset basic acoustic units will be selected with a much lower priority. Once all the basic acoustic units have been selected (step 1104), this method enters the second selection stage. Otherwise, the scores of each of the basic acoustic units included in the sentence will be reset to zero (step 1105) and the selection process returns to step 1102.

The second stage is to set particular scores for the required basic acoustic units according to the frequency distribution of the basic acoustic units in the original text corpus as well as the training set comprising selected sentences (step 1106). Then the total score of each sentence in the text corpus can be calculated in accordance with the individual scores of the basic acoustic units included in the sentence (step 1107). The sentence with highest score is selected (step 1108) and checked to determine if the similarity of the frequency distribution for the basic acoustic units to the desired distribution is increased by selecting such a sentence (step 1109). This is because it is required that the most frequently used basic acoustic units should appear more times in the "training sentences", so more training utterances will improve the recognition accuracy. Therefore, a parameter is used to describe the similarity between the occurrence frequency distribution of each basic acoustic unit in the selected "learning sentences" and that in the real text corpus. This parameter can be used to select additional "learning sentences" so that the desired occurrence frequency distribution of each basic acoustic unit can be achieved and therefore frequently used basic acoustic units will be recognized very accurately. If the answer in step 1109 is yes, then the selected sentence is added into the "learning sentences" (step 1110). Otherwise, the score of the selected sentence is set to zero (step 1111) and the process returns to step 1108. After the selected sentence is added into the "learning sentences", it is checked if the similarity of the frequency distribution reaches a desired value (step 1112). If the answer is yes, then the selected "learning sentence" is the directed set and outputted. Otherwise, update the scores of all basic acoustic units included in the selected sentence (step 1113). The process then returns to step 1107.

Another technique is the "Dynamic Dictionary Structure". The vocabulary contained in the dictionary is so large that it take a substantial time to search, especially the mono-character words and bi-character words. To solve this problem, a "Dynamic Dictionary Structure" is designed in accordance with the present invention. The frequently used mono-character words and bi-character words are selected along with other poly-character words (that is, the words each comprising three or more characters) to constitute a "Frequently Used Dictionary". The remaining words (that is, the remaining mono-character words and bi-character words) are then included in a "Less Frequently Used Dictionary". During operation, the machine will first look up the "Frequently Used Dictionary". If a satisfactory sentence can not be composed because no suitable words can be located in the "Frequently Used Dictionary", then the "Less Frequently Used Dictionary" will be searched. The selected words from the "Less Frequently Used Dictionary", if correct, will be moved to the "Frequently Used Dictionary" after the learning process. Some of the words in the "Frequently Used Dictionary", if not actually frequently used by the user, may also be moved to the "Less Frequently Used Dictionary". Based on this structure, the access time for searching the dictionary can be reduced to about 1/10 relative to the conventional structure.

Figure 12:
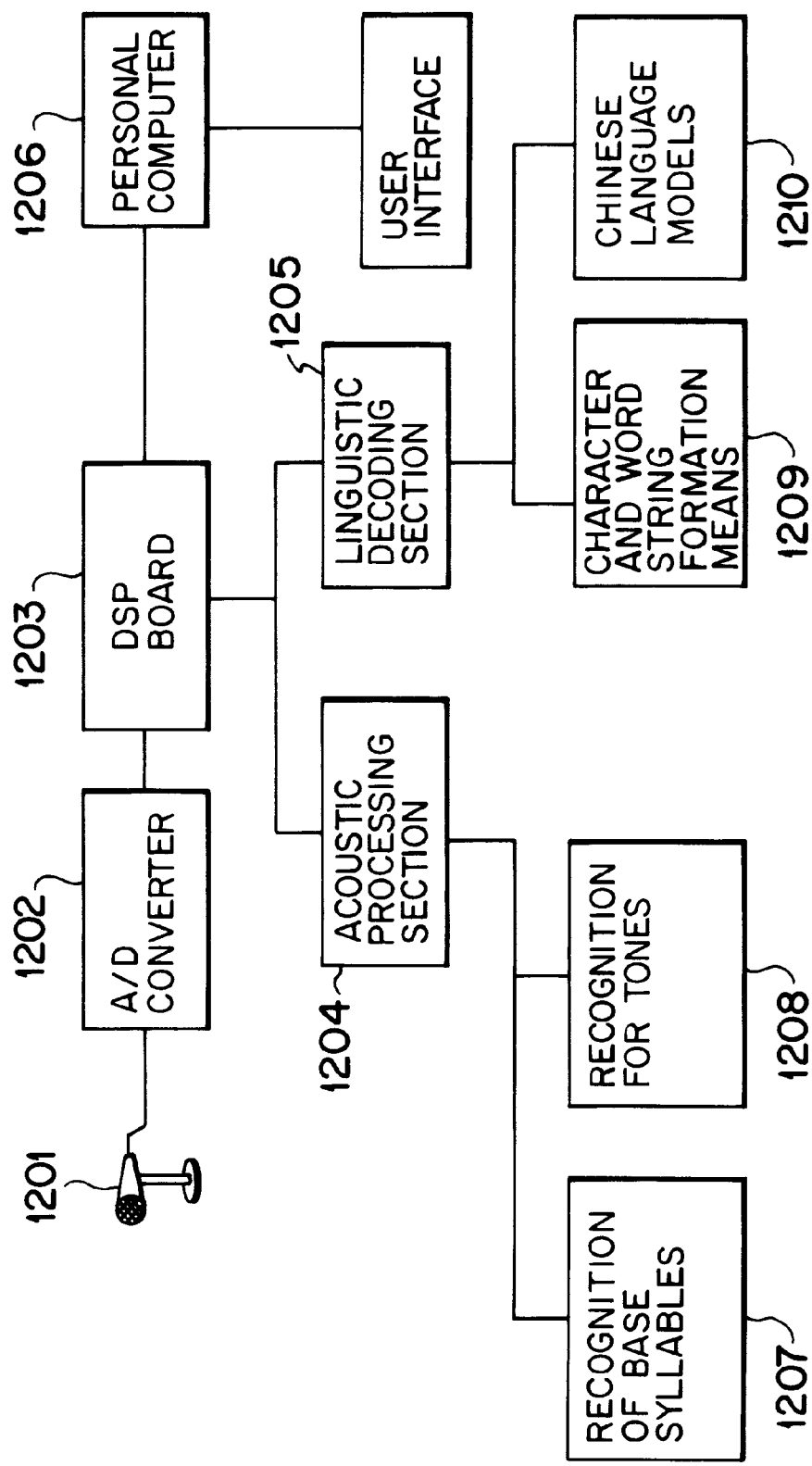
FIG. 12 illustrates a preferred embodiment of a dictation machine in accordance with the present invention.

FIG. 12 illustrates a preferred embodiment of a dictation machine in accordance with the present invention. The speech signals of the user are input via a microphone 1201 and are entered to the DSP (digital signal processor) board 1203 for processing by section of an acoustic processing means 1205 and a linguistic decoding section 1205 through an analog-to-digital converter 1202. Then the speech signals, after being processed will be recognized by the acoustic processing section 1204 of the present invention. As mentioned in FIG. 1, the acoustic processing section 1204 is used to recognize the base syllables 1207 and the tones 1208 of the input speech and the linguistic decoding section 1206 to decode the speech by the character and word string formation means and the Chinese Language Model techniques 1209 and 1210. The speech signals will then be translated into Chinese characters and displayed on the screen of the personal computer. In accordance with the present invention, the dictation machine can be implemented with a typical personal computer. All disclosed techniques described above can be implemented through software which can be stored in the memory device of an Ariel 96002D digital signal processor (DSP) board. These techniques include "Base syllable Models", "Sub-syllable Unit Models", "Tone Models", "Chinese Language Model", various algorithms, and all intelligent learning techniques described above. All necessary calculations are carried out by the Motorola DSP 9600 chip in the DSP board. In fact, many equivalent DSP chips and DSP boards are available in the market. The DSP chip and DSP board employed in the preferred embodiment of the present invention is just the one that has been practiced by the applicant at National Taiwan University. The speech signals of the user are entered into the DSP board through a microphone and, then recognized by the dictation machine. The recognized speech signals will then be translated into Chinese characters and displayed on the screen of the personal computer.

The above embodiment is taken as an illustration of the principle of the present invention, not as limitations to the present invention. It will be apparent to those skilled in the art that many changes may be made to details of the present invention described herein without departing from the spirit and underlying principles thereof. The scope of the present invention should, therefore, be defined only by the appended claims.

I claim:

1. A Mandarin speech input method for directly translating arbitrary sentences of a Mandarin speech input into corresponding Chinese characters, comprising:

acoustic processing of the arbitrary sentences of the Mandarin speech, the acoustic processing step comprising:

employing "Base Syllable Models", formed from "sub-syllable units" of the Mandarin speech, based on "Hidden Markov Models" developed for characteristics of Mandarin mono-syllables in the Mandarin speech, and based on "Tone Models" developed for characteristics of tone of the Mandarin speech, to calculate probabilities of each of the mono-syllables in the Mandarin speech input for recognition; and linguistic decoding an output of the acoustic processing step, the linguistic decoding comprising:

employing "Chinese Language Models" to locate the corresponding Chinese characters for a sequence of the recognized mono-syllables, wherein: the Mandarin speech input comprises continuous speech, and The "Chinese Language Modesl" are generated by combining statistical information, resulting from an analysis of probabilities of associativity among "characters", "words" and "word classes" of a Chinese language, with a linguistic knowledge or rules obtained from an analysis of parts-of-speech, syntax and semantics of the Chinese language.

2. A Mandarin speech input method for directly translating arbitrary sentences of a Mandarin speech input into corresponding Chinese characters, comprising:

acoustic processing of the arbitrary sentences of the Mandarin speech, the acoustic processing step comprising:

employing "Sub-Syllable Unit Models", developed for characteristics of the Mandarin speech, and based on "Tone Models" developed for characteristics of tone of the Mandarin speech, to directly compare with the Mandarin speech input and to locate corresponding mono-syllables from a resultant "sub-syllable unit string" and a "tone string" for recognition; and linguistic decoding an output of the acoustic processing, the linguistic decoding comprising:

employing "Chinese Language Models" to locate the corresponding Chinese characters for a sequence of the recognized mono-syllables, wherein:

the Mandarin speech input comprises continuous speech, and the "Chinese Language Models" are generated by combining statistical information, resulting from an analysis of probabilities of associativity among "characters", "words" and "word classes" of a Chinese language, with a linguistic knowledge or rules obtained from an analysis of parts-of-speech, syntax and semantics of the Chinese language.

3. A method as claimed in one of claims 1 and 2, wherein the acoustic processing step comprises:

(1) detecting endpoints of the Mandarin speech input to locate a starting point and an ending point of the Mandarin speech input;

(2) recognizing base syllables and the tones of the Mandarin speech input by respectively comparing the "Base Syllable Models" or the "Sub-syllable Unit Models" with the Mandarin speech input to locate corresponding base syllables and to locate corresponding tones from the "Tone Models" for forming words and sentences; and (3) selecting base syllable strings and tone strings from possible base syllables and tones obtained from the recognizing step as base syllable and tone string candidates and providing the base syllable and the tone string candidates for the linguistic decoding step.

4. A method as claimed in claim 3, wherein the step of recognizing the base syllables and the tones utilizes a "Pattern Matching Algorithm for Continuous Syllables" and a "Word-based Matching Algorithm for Syllables".

5. A method as claimed in claim 4, wherein the "Word-based Matching Algorithm Matching for Vocabulary Syllables" comprises:

(1) setting up a "tree dictionary data structure" representing all words in a built-in dictionary of a computer in accordance with an order of base syllables, disregarding tones, or mono-syllables, with tones;

(2) moving along the tree dictionary data structure to find a word, each node of the tree dictionary data structure representing a base syllable or a mono-syllable; and (3) considering in first priority base syllables or mono-syllables adjacent to each other in each word along paths in the tree dictionary data structure in accordance with probabilities of each base syllable or mono-syllable being adjacent to a preceding and a following base syllable or mono-syllable thereof so as to reduce a search space and improve a correct recognition rate.

6. A method as claimed in claim 5, wherein word occurrence frequencies are used to locate the words in such a manner that frequently used words are considered before less frequently used words.

7. A method as claimed in claim 4, wherein the "Pattern Matching Algorithm for Continuous Syllables" comprises:

(1) locating starting points and ending points of each possible syllable by means of an instantaneous energy and a range of syllable duration of an input speech segment;

(2) comparing each of the possible mono-syllables between each pair of the starting points and the ending points with the "Sub-syllable Unit Models" or the "Base Syllable Models" and the "Tone Models";

(3) calculating and accumulating a score after the comparing step with respect to each of the possible mono-syllables between each pair of the starting points and the ending points from a beginning to an end of a whole speech utterance in accordance with "Dynamic Programming" to locate a possible combination of "base syllable strings" and "tone strings" of the whole speech utterance; and (4) outputting the "base syllable strings" and the "tone strings" with the highest scores.

8. A method as claimed in claim 3, wherein the "sub-syllable Unit Models" and "tone models", for tone recognition, are the "Hidden Markov Models" trained by interpolation training, the interpolation training comprising:

first stage training of models;

performing second stage training by processing an output of the first stage training to produce required models; and interpolating the models generated from each recursive training iteration during the second stage training step with the models generated from the first stage training step for utilizing a precision of the models generated during the first stage training step.

9. A method as claimed in one of claims 1 and 2, further comprising:

establishing a set of "tone models" for tone recognition of continuous Mandarin speech in which a tone is affected by a preceding and a following tone, wherein the "tone models" judge a feature of each tone affected by a corresponding preceding tone and a corresponding following tone to combine the feature with other features of tone in order to reduce a number of all 175 "tone models" while the tones can be fully recognized.

10. A Mandarin speech input method for directly translating arbitrary sentences of a Mandarin speech input into corresponding Chinese characters, comprising:

acoustic processing of the arbitrary sentences of the Mandarin speech, the acoustic processing comprising:
employing "Sub-Syllable Unit Models", developed for characteristics of the Mandarin speech, and based on "Tone Models" developed for characteristics of tone of the Mandarin speech, to directly compare with the Mandarin speech input and to locate corresponding mono-syllables from a resultant "sub-syllable unit string" and a "tone string" for recognition; and linguistic decoding an output of the acoustic processing, the linguistic decoding comprising:
employing "Chinese Language Models" to locate the corresponding Chinese characters for a sequence of the recognized mono-syllables,
comparing base syllable string candidates and tone string candidates provided by the acoustic processing with a built-in dictionary by means of a "character and word string formation means" to locate all possible homonym characters or homonym words formed therefrom for generating a word lattice,
calculating probabilities for generation of sentences, each of the sentences composed of the words in the word lattice in accordance with the "Chinese Language Models" and linguistic knowledge, and
outputting the sentence with the highest probability or score, wherein:

the Mandarin speech input comprises continuous speech, and the "Chinese Language Models" are generated by combining statistical information, resulting from an analysis of probabilities of associativity among "characters", "words" and "word classes" of a Chinese language, with a linguistic knowledge or rules obtained from an analysis of parts-of-speech, syntax and semantics of the Chinese language.

11. A method as claimed in claim 10, wherein the probabilities for generation of the sentences, each composed of words in word family candidates in accordance with the "Chinese Language models" including occurrence probabilities of a "character", a "word", a "word class", two "characters", "words" or "word classes" adjacent to each other, three "characters", "words" or "word classes" adjacent to each other, and a plurality of "characters", "words" or "word classes" present in a same sentence.

12. A method as claimed in claim 11, further comprising:
classifying words into the word classes, comprising:

(1) classifying the words into a plurality of word groups, each of the word groups having common parts-of-speech, semantics and syntax in accordance with a linguistic knowledge;

(2) dividing the words, which are classified into any of the word groups during step 1 into a plurality of word sub-groups with consistent statistical characteristics including statistical characteristics pertaining to preceding words, following words, and word-pairs that tend to be present in a same sentence, obtained from a Chinese text corpus; and (3) recombining the word sub-groups into a final word class.

13. A method as claimed is claim 10, wherein each of the mono-syllables provided by the acoustic processing step has a score corresponding to the recognition in the acoustic processing step, and wherein a character or a word composed of the ones of the mono-syllables with first scores shall be considered before another character or word composed of other ones of the mono-syllables with second scores, wherein the second scores are less than the first scores.

14. A method as claimed in claim 10, wherein the "Chinese Language Models" further calculate occurrence probabilities of one mono-syllable, two mono-syllables adjacent to each other, and three mono-syllables adjacent to each other.

15. A method as claimed in claim 10, wherein the "Chinese Language Models" are capable of correcting errors generated by the acoustic processing step.

16. A Mandarin dictation machine for receiving Mandarin speech input, comprising:

filtering and analog-to-digital converting means for filtering and converting speech input signals into digital signals;

a personal computer and add-in digital signal processor board for receiving and processing the digital signals provided by the analog-to-digital converting means;

feature extracting means and pitch frequency detecting means, connected to the personal computer, for detecting and calculating pitch frequencies and other feature parameters of the digital signals provided by the personal computer;

endpoint detection means and "Hidden Markov Models" processing means, in conjunction with Mixtures of Gaussian Probabilities processing means, for calculating endpoints of each speech segment of the Mandarin speech input and for recognizing base syllables and tones thereof;

a set of "character-based", "word-based" or "word-class-based" Chinese Language Models, set up by calculating occurrence probabilities and including a linguistic knowledge, for calculating probabilities of each homonym character and words for syllables of the Mandarin input speech and for further forming word strings or sentences and providing recognized results to the personal computer; and training and learning means for training and learning probabilities of "Hidden Markov Models" for all "sub-syllable units", base syllables and tones and probabilities or knowledge of the "Chinese Language Models" and for providing the probabilities or the knowledge to the personal computer wherein the Mandarin speech input comprises continuous speech, wherein the "Chinese Language Modesl" are generated by combining statistical information, resulting from an analysis of probabilities of associativity among "characters", "words" and "word classes" of a Chinese language, with the linguistic knowledge or rules obtained from an analysis of parts-of-speech, syntax and semantics of the Chinese language.

17. A Mandarin dictation machine as claimed in claim 16, wherein the Mandarin speech input uses speech segments including a mono-syllable, a word, a prosodic segment, or a whole sentence as an input unit.

18. A Mandarin dictation machine as claimed in claim 16, further comprising a display screen for displaying input phonetic symbols and Chinese characters; and a correction software provided for a user to directly correct errors on the display screen by means of a mouse.

19. A Mandarin dictation machine as claimed in claim 16, further comprising:

a dynamic memory device for storing a wording and idioms of the user or special words which have a plurality of occurrences in certain input texts, wherein the wording, the idioms or the special words are stored in different memory areas in accordance with occurrence frequencies of the wording, the idioms or the special words which can be included in a global dictionary and Chinese Language Models along with corresponding messages and which can be deleted after use.

20. A Mandarin dictation machine as claimed in claim 16, further comprising:

a first memory device for storing a first group of words; and a second memory device for storing a second group of words, wherein during operation the Mandarin dictation machine will first search in the first memory device for the first group of words and will then search in the second memory device for the second group of words if required words cannot be found in the first memory device, the found words of the second group of words will be moved to the first memory device, wherein some of the words stored in the first memory device are moved to the second memory device if the some of the words stored in the first memory device are used less than a given amount over time.

21. A method for training the Mandarin dictation machine to be adapted to a voice and an environment of a user, comprising using a plurality of learning algorithms comprising:

a first learning algorithm;

a second learning algorithm;

a third learning algorithm; and a fourth learning algorithm, wherein (1) the first learning algorithm is automatic learning of a user's voice through "learning sentences" arranged in a plurality of learning stages;

(2) the second learning algorithm is automatic "on-line" real-time learning for the user's voice, and the second learning algorithm can be used in conjunction with the first learning algorithm;

(3) the third learning algorithm is automatic learning for environmental noise; and (4) the fourth learning algorithm is automatic learning for special words, a wording and a sentence style of the user, wherein:

input to the Mandarin dictation machine is in a form comprising continuous speech, the fourth learning algorithm dynamically adjusts statistical parameters and linguistic knowledge in "Chinese Language Models" and can add new words to a global dictionary, while the fourth learning algorithm stores the wording and idioms of the user or the special words which have a plurality of occurrences in a certain input text in a dynamic memory device which will be accessed in first priority, and the wording, the idioms or the special words are stored in different memory areas in accordance with occurrence frequencies of the wording, the idioms or the special words, the "Chinese Language Models" are generated by combining statistical information, resulting from an analysis of probabilities of associativity among "characters", "words" and "word classes" of a Chinese language, with the linguistic knowledge or rules obtained from an analysis of parts-of-speech, syntax and semantics of the Chinese language.

22. A method as claimed in claim 21, wherien in each of the plurlaity of learning stages of the automatic learning algorithm a new user shall utter a set of specially-designed sentences which include all basic acoustic units of Mandarin speech, including a sub-syllable unit, a phoneme, an "initial", a "final", a mono-syllable, and a tone, in a number of sentences in which certain ones of acoustic units will be present at least a given number of times so that after several utterances a "Hidden Markov Models" can be trained and the Mandarin dictation machine will be adapted to pronouncing styles of the new user;

the pronouncing styles of the new user are recorded, the Mandarin dictation machine learning the pronouncing styles of the new user when the new user repeatedly utters the specially-designed sentences, wherein with a different emphasis of the basic acoustic units arranged in the "learning sentences" of each learning stage, a correct recognition rate for recognizing a voice of the new user can be improved in such a manner that a plurality of basic acoustic units are uttered through the number of sentences in the first learning stage;

said Mandarin dictation machine will learn the voice of the new user and the correct recognition rate will be improved in successive learning stages.

23. A method as claimed in claim 21, wherein the on-line real-time learning algorithm can be carried out during the learning stages or during use of the Mandarin dictation machine, wherein during the on-line real-time learning algorithm the user corrects erroneously recognized voices or texts generated by the Mandarin dictation machine on a real-time basis so that the dictation machine will learn correct voices and texts on the real-time basis and will store corresponding texts of the corrected voice.

24. A method as claimed in claim 21, wherein the automatic learning algorithm for environmental noise is carried out in conjunction with learning algorithms for the voice of the user so that the environmental noise is also averaged into feature parameters of "Hidden Markov Models" for the Mandarin dictation machine to be adapted to the environmental noise.

25. A method as claimed in claim 21, wherein the "learning sentences" for the Mandarin dictation machine are selected by a computer from a Chinese text corpus through a selection step, the selection step comprising:

giving different scores for all basic acoustic units in Mandarin;

selecting a sentence in a high priority if the sentence is composed of basic acoustic units corresponding to a total score being greater than total scores of other sentences composed of basic acoustic units; and using a parameter, which described an occurrence frequency distribution of each of the basic acoustic units in the selected learning sentences as compared to a specific distribution, as a criterion of the selection step.

26. A training method for training a Mandarin dictation machine to recognize a Mandarin speech input of a new user, comprising:

(1) training "Hidden Markov Models" of each "Sub-syllable Units" and "Tone Model" in Mandarin with voices from multiple speakers, wherein an amount of Mixtures of Gaussian Probabilities is required to describe each state since feature parameters of the multiple speakers are different, the training step further comprising:

(i) inputting a training speech of the new user, the training speech comprising continuous Mandarin speech;

(ii) setting up "Hidden Markov Models" of the new user, the setting up step comprising:

obtaining a "sub-syllable unit" segment from the training speech of the new user;

selecting a plurality of the Mixtures of Gaussian Probabilities, from a group of the Mixtures of Gaussian Probabilities in the "Hidden Markov Models" for the multiple speakers, and de-emphasizing other Mixtures of Gaussian Probabilities;

(iii) generating a new "Hidden Markov Models", the generating step further comprising:

continuously obtaining the "sub-syllable unit" segments of the new user, and averaging feature parameters of the continuously pronounced "sub-syllable unit" segments into the "Hidden Markov Models" of the new user, set up in step (ii), to calculate new Mixtures of Gaussian Probabilities; and (iv) repeating step (iii) to include more features of the new user in the Hidden Markov Models" so that a "Hidden Markov Models" which can better describe a voice of the new user is thus generated.

27. A training method as claimed in claim 23, wherein the training method further comprises using a computer to perform steps 1, including steps i–iv, of claim 26, the training method further comprising:

correcting, on an on-line real-time basis, errors generated while the computer executes a process to recognize the Mandarin speech input of the new user;

providing results of the correcting step to a memory device;

repeating the steps i–iv of claim 23 so that the Mandarin dictation machine can learn a new voice on a real-time basis; and using the new "Hidden Markov Models" when repeating the steps i–iv of claim 23 to continuously improve a correct recognition rate.

28. A Mandarin speech input method for directly translating arbitrary sentences of a Mandarin speech input into corresponding Chinese characters, comprising:

inputting the Mandarin speech, the Mandarin speech being continuous speech;

acoustic processing of the arbitrary sentences of the continuous Mandarin speech, the acoustic processing step comprising:

employing "Base Syllable Models", formed form "sub-syllable units" of the Mandarin speech, based on "Hidden Markov Models" developed for characteristics of Mandarin mono-syllables in the Mandarin speech, and based on "Tone Models" developed for characteristics of tone of the Mandarin speech, to calculate probabilities of each of the mono-syllables in the Mandarin speech input for further recognition; and linguistic decoding an output of the acoustic processing, the linguistic decoding comprising:

employing "Chinese Language Models" to locate the corresponding Chinese characters for a sequence of the recognized mono-syllables, wherein words and sentences are formed by the "Base Syllable Models" for further recognition.

29. A method as claimed in claim 28, wherein
the "sub-syllable Unit Models" and "tone models", for tone recognition, are the "Hidden Markov Models" trained by interpolation training, the interpolation training comprising:
first stage training of models; and
performing second stage training by processing an output of the first stage training to produce required models;
interpolating the models generated from each recursive training iteration during the second stage training step with the models generated from the first stage training step for utilizing a precision of the models generated during the first stage training step.

30. A method as claimed in claim 1 or 2, wherein the "word class" includes a plurality of words comprising a same ending character, a same beginning character, or common syntactic characteristics, semantic characteristics and statistical characteristics.

31. A method as claimed in claim 30, further comprising: classifying words into word classes, comprising:
  (1) classifying the words into a plurality of word groups, each of the word groups having common parts-of-speech, semantics and syntax in accordance with a linguistic knowledge;
  (2) dividing the words, which are classified into any of the word groups during step 1 into a plurality of word sub-groups with consistent statistical characteristics including statistical characteristics pertaining to preceding words, following words, and word-parts that tend to be present in a same sentence, obtained from a Chinese text corpus; and
  (3) recombining the word sub-groups into a final word class.

32. A Mandarin speech input method for directly translating arbitrary sentences of a Mandarin speech input into corresponding Chinese characters, comprising:
  acoustic processing of the arbitrary sentences of the Mandarin speech, the acoustic processing step comprising:
    employing "Base Syllable Models", formed from "sub-syllable units" of the Mandarin speech, based on "hidden Markov Models" developed for characteristics of Mandarin mono-syllables in the Mandarin speech, and based on "Tone Models" developed for characteristics of tone of the Mandarin speech, to calculate probabilities of each of the mono-syllables in the Mandarin speech input for recognition,
    detecting endpoints of the Mandarin speech input to locate a starting point and an ending point of the Mandarin speech input,
    recognizing base syllables and the tones of the Mandarin speech input by respectively comparing the "Base Syllable Models" or the "Sub-syllable Unit Models" with the Mandarin speech input to locate corresponding base syllables and to locate corresponding tones from the "Tone Models" for forming words and sentences, the recognizing the base syllables and the tones utilizing a "pattern Matching Algorithm for Continuous Syllables" and a "Word-based Matching Algorithm for Syllables", and
    selecting base syllable strings and tone strings from possible base syllables and tones obtained from the recognizing as base syllable and tone string candidates and providing the base syllable and the tone string candidates for the linguistic decoding; and
  linguistic decoding an output to the acoustic processing step, the linguistic decoding comprising:
    employing "Chinese Language Models" to locate the corresponding Chinese characters for a sequence of the recognized mono-syllables, wherein; the Mandarin speech input comprises continuous speech,
    the "Chinese Language Models" are generated by combining statistical information, resulting from an analysis of probabilities of associativity among "characters", "words" and "word classes" of a Chinese language, with a linguistic knowledge or rules obtained from an analysis of parts-of-speech, syntax and semantics of the Chinese language,
    the "Word-based Matching Algorithm Matching for Syllables" comprises:
      (1) setting up a "tree dictionary data structure" representing all words in a built-in dictionary of a computer in accordance with an order of base syllables, disregarding tones, or mono-syllables, with tones,
      (2) moving along the tree dictionary data structure to find a word, each node of the tree dictionary data structure representing a base syllable or a mono-syllable, and
      (3) considering in first priority base syllables or mono-syllables adjacent to each other in each word along paths in the tree dictionary data structure in accordance with probabilities of each base syllable or mono-syllable being adjacent to a preceding and a following base syllable or mono-syllable thereof so as to reduce a search space and improve a correct recognition rate,
    a linguistic knowledge included in the "Chinese Language Models" includes knowledge, rules and information, obtained from a linguistic analysis of parts-of-speech, syntax and semantics of Chinese, in combination with linguistic information obtained from an analysis of a Chinese text corpus, and
    word occurrence frequencies are used to locate the words in such a manner that frequently used words are considered before less frequently used words.

33. A Mandarin speech input method for directly translating arbitrary sentences of a Mandarin speech input into corresponding Chinese Characters, comprising:
  acoustic processing of the arbitrary sentences of the Mandarin speech, the acoustic processing step comprising:
    employing "Base Syllable Models", formed from "sub-syllable units" of the Mandarin speech, based on "Hidden Markov Models" developed for characteristics of Mandarin mono-syllables in the Mandarin speech, and based on "Tone Models" developed for characteristics of tone of the Mandarin speech to calculate probabilities of each of the mono-syllables in the Mandarin speech input and each of a plurality of tones of the Mandarin speech input for further recognition; and
  linguistic decoding an output of the acoustic processing, the linguistic decoding comprising:
    employing "Chinese Language Models" to locate the corresponding Chinese characters for a sequence of the recognized mono-syllables,
  wherein a sub-syllable unit of the sub-syllable units is a phoneme which is affected by a following phoneme, and
  the Mandarin speech input comprises continuous speech.

34. A Mandarin speech input method for directly translating arbitrary sentences of a Mandarin speech input into corresponding Chinese characters, comprising:

inputting the Mandarin speech, the Mandarin speech being continuous speech;

acoustic processing of the arbitrary sentences of the continuous Mandarin speech, the acoustic processing step comprising:

employing "Base Syllable Models", formed from "sub-syllable units" of the Mandarin speech, based on "Hidden Markov Models" developed for characteristics of Mandarin mono-syllables in the Mandarin speech, and based on "Tone Models" developed for characteristics of tone of the Mandarin speech to calculate probabilities of each of the mono-syllables in the Mandarin speech input and each of a plurality of tones of the Mandarin speech input for further recognition; and linguistic decoding an output of the acoustic processing, the linguistic decoding comprising:

employing "Chinese Language Models" to locate the corresponding Chinese characters for a sequence of the recognized mono-syllables, wherein each one of the "sub-syllable units" is formed from an "initial" affected by a starting phoneme of a following "final" thereof or an other "final" unaffected by a preceding and a following phoneme.

35. A method Mandarin speech input method for directly translating arbitrary sentences of a Mandarin speech input into corresponding Chinese characters, comprising:

acoustic processing of the arbitrary sentences of the Mandarin speech, the acoustic processing step comprising:

employing "Base Syllable Models", formed from "sub-syllable units" of the Mandarin speech, based on "Hidden Markov Models" developed for characteristics of Mandarin mono-syllables in the Mandarin speech, and based on "Tone Models" developed for characteristics of tone of the Mandarin speech, to calculate probabilities of each of the mono-syllables in the Mandarin speech input for recognition; and linguistic decoding an output of the acoustic processing step, the linguistic decoding comprising:

employing "Chinese Language Models" to locate the corresponding Chinese characters for a sequence of the recognized mono-syllables;

classifying words into word classes, comprising:

(1) classifying the words into a plurality of word groups, each of the word groups having common parts-of-speech, semantics and syntax in accordance with a linguistic knowledge, (2) dividing the words, which are classified into any of the word groups during step 1 into a plurality of word sub-groups with consistent statistical characteristics including statistical characteristics pertaining to preceding words, following words, and word-pairs that tend to be present in a same sentence, obtained from a Chinese text corpus, and (3) recombining the word sub-groups into a final word class, wherein: the Mandarin speech input comprises continuous speech, and the "Chinese Language Models" are generated by combining statistical information, resulting from an analysis of probabilities of associativity among "characters", "words" and "word classes" of a Chinese language, with a linguistic knowledge or rules obtained from an analysis of parts-of-speech, syntax and semantics of the Chinese language.

* * * * *